US008034750B2

(12) United States Patent
Thompson et al.

(10) Patent No.: US 8,034,750 B2
(45) Date of Patent: Oct. 11, 2011

(54) BOROZIRCONATE SYSTEMS IN COMPLETION SYSTEMS

(75) Inventors: Joseph Earl Thompson, Houston, TX (US); Sarkis R. Kakadjian, San AnStonio, TX (US)

(73) Assignee: Clearwater International LLC, Houston, TX (US)

( * ) Notice: Subject to any disclaimer, the term of this patent is extended or adjusted under 35 U.S.C. 154(b) by 600 days.

(21) Appl. No.: 11/748,248

(22) Filed: May 14, 2007

(65) Prior Publication Data
US 2008/0287325 A1 Nov. 20, 2008

(51) Int. Cl.
*C09K 8/68* (2006.01)
*C23F 11/18* (2006.01)
*E21B 43/26* (2006.01)
*E21B 43/267* (2006.01)

(52) U.S. Cl. ........ 507/273; 507/203; 507/271; 507/903; 166/280.1; 166/280.2; 166/305.1; 166/307; 166/308.1

(58) Field of Classification Search .............. 507/273, 507/203, 271, 903; 166/280.1, 280.2, 305.1, 166/307, 308.1
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |

(Continued)

FOREIGN PATENT DOCUMENTS

CA 2125513 1/1995

(Continued)

OTHER PUBLICATIONS

U.S. Appl. No. 12/075,461, filed Mar. 11, 2008, Gatlin et al.
U.S. Appl. No. 11/554,834, filed Oct. 31, 2006, Venditto et al.
U.S. Appl. No. 11/765,306, filed Jun. 19, 2007, Kakadjian et al.
U.S. Appl. No. 11/748,248, filed May 14, 2007, Thompson et al.
U.S. Appl. No. 11/736,971, filed Apr. 18, 2007, Kippie et al.
U.S. Appl. No. 11/767,384, filed Jun. 22, 2007, Sweeney et al.
U.S. Appl. No. 11/741,110, filed Apr. 27, 2007, Wilson, Jr. et al.
U.S. Appl. No. 11/677,434, filed Feb. 21, 2007, Wanner et al.
U.S. Appl. No. 11/736,992, filed Apr. 18, 2007, Zamora et al.
U.S. Appl. No. 11/760,581, filed Jun. 8, 2007, Schwartz.

(Continued)

*Primary Examiner* — Timothy J. Kugel
*Assistant Examiner* — Atnaf Admasu
(74) *Attorney, Agent, or Firm* — Robert W Strozier

(57) ABSTRACT

A cross-linking system for hydratable polymers for using is formation fracturing applications is disclosed along with methods for using same, where the cross-linking system includes a reaction product of a transition metal alkoxide or alkanolate and a borate or borate generating reagent.

25 Claims, 20 Drawing Sheets

U.S. PATENT DOCUMENTS

| | | | | |
|---|---|---|---|---|
| 5,082,579 | A | 1/1992 | Dawson | 507/211 |
| 5,106,518 | A | 4/1992 | Cooney et al. | 507/21 |
| 5,110,486 | A | 5/1992 | Manalastas et al. | 507/260 |
| 5,169,411 | A | 12/1992 | Weers | 44/421 |
| 5,224,546 | A | 7/1993 | Smith et al. | 166/300 |
| 5,228,510 | A | 7/1993 | Jennings, Jr. et al. | 166/263 |
| 5,246,073 | A | 9/1993 | Sandiford et al. | 166/295 |
| 5,259,455 | A | 11/1993 | Nimerick et al. | 166/308.5 |
| 5,330,005 | A | 7/1994 | Card et al. | 166/280.2 |
| 5,342,530 | A | 8/1994 | Aften et al. | 252/8.551 |
| 5,347,004 | A | 9/1994 | Rivers et al. | 544/180 |
| 5,363,919 | A | 11/1994 | Jennings, Jr. | 166/308.1 |
| 5,402,846 | A | 4/1995 | Jennings, Jr. et al. | 166/259 |
| 5,411,091 | A | 5/1995 | Jennings, Jr. | 166/280.1 |
| 5,424,284 | A | 6/1995 | Patel et al. | 507/129 |
| 5,439,055 | A | 8/1995 | Card et al. | 166/280.2 |
| 5,462,721 | A | 10/1995 | Pounds et al. | 423/226 |
| 5,465,792 | A | 11/1995 | Dawson et al. | 166/295 |
| 5,472,049 | A | 12/1995 | Chaffee et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308.1 |
| 5,501,275 | A | 3/1996 | Card et al. | 166/280.2 |
| 5,551,516 | A | 9/1996 | Norman et al. | 166/308.2 |
| 5,624,886 | A | 4/1997 | Dawson et al. | 507/217 |
| 5,635,458 | A | 6/1997 | Lee et al. | 507/240 |
| 5,649,596 | A | 7/1997 | Jones et al. | 166/300 |
| 5,669,447 | A | 9/1997 | Walker et al. | 166/300 |
| 5,674,377 | A | 10/1997 | Sullivan, III et al. | 208/208 R |
| 5,688,478 | A | 11/1997 | Pounds et al. | 423/228 |
| 5,693,837 | A | 12/1997 | Smith et al. | 556/148 |
| 5,711,396 | A | 1/1998 | Joerg et al. | 180/444 |
| 5,722,490 | A | 3/1998 | Ebinger | 166/281 |
| 5,744,024 | A | 4/1998 | Sullivan, III et al. | 208/236 |
| 5,755,286 | A | 5/1998 | Ebinger | 166/300 |
| 5,775,425 | A | 7/1998 | Weaver et al. | 166/276 |
| 5,787,986 | A | 8/1998 | Weaver et al. | 166/280.2 |
| 5,806,597 | A | 9/1998 | Tjon-Joe-Pin et al. | 166/300 |
| 5,807,812 | A | 9/1998 | Smith et al. | 507/238 |
| 5,833,000 | A | 11/1998 | Weaver et al. | 166/276 |
| 5,853,048 | A | 12/1998 | Weaver et al. | 166/279 |
| 5,871,049 | A | 2/1999 | Weaver et al. | 166/276 |
| 5,877,127 | A | 3/1999 | Card et al. | 507/273 |
| 5,908,073 | A | 6/1999 | Nguyen et al. | 166/276 |
| 5,908,814 | A | 6/1999 | Patel et al. | 507/131 |
| 5,964,295 | A | 10/1999 | Brown et al. | 166/308.2 |
| 5,979,557 | A | 11/1999 | Card et al. | 166/300 |
| 5,980,845 | A | 11/1999 | Cherry | 423/229 |
| 6,016,871 | A | 1/2000 | Burts, Jr. | 166/300 |
| 6,035,936 | A | 3/2000 | Whalen | 166/308.5 |
| 6,047,772 | A | 4/2000 | Weaver et al. | 166/276 |
| 6,054,417 | A | 4/2000 | Graham et al. | 507/238 |
| 6,059,034 | A | 5/2000 | Rickards et al. | 166/280.2 |
| 6,060,436 | A | 5/2000 | Snyder et al. | 507/246 |
| 6,069,118 | A | 5/2000 | Hinkel et al. | 507/277 |
| 6,123,394 | A | 9/2000 | Jeffrey | 299/16 |
| 6,133,205 | A | 10/2000 | Jones | 507/276 |
| 6,147,034 | A | 11/2000 | Jones et al. | 507/238 |
| 6,162,449 | A | 12/2000 | Maier et al. | 424/401 |
| 6,162,766 | A | 12/2000 | Muir et al. | 507/267 |
| 6,169,058 | B1 | 1/2001 | Le et al. | 507/222 |
| 6,228,812 | B1 | 5/2001 | Dawson et al. | 507/221 |
| 6,247,543 | B1 | 6/2001 | Patel et al. | 175/64 |
| 6,267,938 | B1 | 7/2001 | Warrender et al. | 423/226 |
| 6,283,212 | B1 | 9/2001 | Hinkel et al. | 166/279 |
| 6,291,405 | B1 | 9/2001 | Lee et al. | 507/136 |
| 6,330,916 | B1 | 12/2001 | Rickards et al. | 166/280.2 |
| 6,725,931 | B2 | 4/2004 | Nguyen et al. | 166/280.2 |
| 6,756,345 | B2 | 6/2004 | Pakulski et al. | 507/246 |
| 6,793,018 | B2 | 9/2004 | Dawson et al. | 166/300 |
| 6,832,650 | B2 | 12/2004 | Nguyen et al. | 166/279 |
| 6,875,728 | B2 | 4/2005 | Gupta et al. | 507/240 |
| 7,140,433 | B2 | 11/2006 | Gatlin et al. | 166/250.01 |
| 7,268,100 | B2 | 9/2007 | Kippie et al. | 507/244 |
| 7,350,579 | B2 | 4/2008 | Gatlin et al. | 166/308.3 |
| 2002/0049256 | A1 | 4/2002 | Bergeron, Jr. | 514/674 |
| 2002/0165308 | A1 | 11/2002 | Kinniard et al. | 524/492 |
| 2003/0220204 | A1 | 11/2003 | Baran, Jr. et al. | 507/200 |
| 2005/0045330 | A1 | 3/2005 | Nguyen et al. | 166/281 |
| 2005/0092489 | A1 | 5/2005 | Welton et al. | 166/280.2 |
| 2005/0130845 | A1* | 6/2005 | Freeman et al. | 507/100 |
| 2005/0137114 | A1 | 6/2005 | Gatlin et al. | 510/424 |
| 2005/0153846 | A1 | 7/2005 | Gatlin | 208/236 |
| 2005/0250666 | A1 | 11/2005 | Gatlin et al. | 510/492 |
| 2006/0194700 | A1 | 8/2006 | Gatlin et al. | 507/203 |
| 2006/0211580 | A1* | 9/2006 | Wang et al. | 507/209 |
| 2007/0032693 | A1 | 2/2007 | Gatlin et al. | 507/239 |
| 2007/0129257 | A1 | 6/2007 | Kippie et al. | 507/102 |
| 2007/0131425 | A1 | 6/2007 | Gatlin et al. | 166/280.2 |
| 2007/0173413 | A1 | 7/2007 | Lukocs et al. | 507/238 |
| 2007/0173414 | A1 | 7/2007 | Wilson, Jr. | 507/131 |
| 2008/0039345 | A1 | 2/2008 | Kippie et al. | 507/213 |

FOREIGN PATENT DOCUMENTS

| | | |
|---|---|---|
| CA | 2007965 | 2/1996 |
| DE | 4027300 | 5/1992 |
| EP | 0730018 A1 | 9/1996 |
| GB | 775376 | 10/1954 |
| GB | 816337 A | 7/1959 |
| GB | 1073338 A | 6/1967 |
| JP | 10001461 | 6/1988 |
| JP | 08151422 | 11/1996 |
| JP | 10110115 A | 4/1998 |
| JP | 2005194148 A | 7/2005 |
| WO | WO 98/19774 | 5/1998 |
| WO | WO 98/56497 | 12/1998 |

OTHER PUBLICATIONS

U.S. Appl. No. 12/029,335, filed Feb. 11, 2008, Kakadjian et al.

1983, Sartori, F. and Savage, D.W., Sterically Hindered Amines for $CO_2$ Removal from Gases, Ind. Eng. Chem. Fundam., 22, 239-249.

1999, Fushslueger, U., Socher, G., Grether, H.-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 71, 2324-2333.

1975, Kauffman, W.J., Observations on the Synthesis and Characterization of N,N',N[10]-Tris-(dimethylaminopropyly)hexahydro-s-triazine and isolable intermediates, XP009005168.

1896, Delepine, M., Effect of Hydrogen Sulfide on Trimethyltrimethyl Triamine, Bull. Soc. Chim., 1896, 14, 889-891 (English Translation).

1896, Delepine, M., Effect of Hydrogen Sulfide and Trimethyltrimethyl Triamine, Ann. Chim. Phys., 1896, 4, 114-133 (English Translation).

1949, Paquin, A.M., Reaction of Primary Amines with Aliphatic Aldehydes, Chem. Ber., 82, 316-326 (English Translation).

2000, Castillo, M., Avila, Y.S., Rodrigues, R.E., Viloria, A., H2S Liquid Scavengers, Their Corrosivity Properites and the Compatibility with Other Down Stream Processes, Corrosion 2000, paper 00491.

* cited by examiner

BOROZIRCONATE SYSTEMS IN COMPLETION SYSTEMS

BACKGROUND OF THE INVENTION

1. Field of the Invention

The present invention relates to a fracturing composition including a two-component cross-linking system for hydratable polymers and to methods for making and using same.

More particularly, the present invention relates to a fracturing composition including a two-component cross-linking system for hydratable polymers and to methods for making and using same, where the two-component cross-linking system includes a reaction product of a transition metal alkoxide or alkanolate and a borate or borate generating agent.

2. Description of the Related Art

One of the key problems when using organo-metallic crosslinking systems such as zirconate based cross-linking systems is these systems do not show fast cross-linking in system including hydrated galactomannan gelling agents like carboxymethylhydroxypropylguar (CMHPG) when tested at surface conditions (i.e., at room temperature and ambient pressure). One way to address such problems is to combine the organozirconates with borate ions to produce compounds the accelerate the cross-linking reaction. The typical borate ions include boric acid, alkali metal borates, alkaline earth metal borates and polymeric borate compounds. Although these two crosslinking systems increase the surface cross-linking properties of the systems, it shows different crosslinking densities over the gel and has high temperature stability problems, especially at high borate ion loading.

Historically, companies in the industry have been combining borate ions and organozirconate in cross-linking systems for cross-linking CMHPG gel systems in order to show higher surface cross-linking properties. For example, U.S. Pat. No. 6,214,773 disclosed an improved high temperature, low residue viscous well treating fluid comprising: water; a hydrated galactomannan gelling agent present in said treating fluid in an amount in the range of from about 0.12% to about 0.48% by weight of said water in said treating fluid; a retarded cross-linking composition for buffering said treating fluid and cross-linking said hydrated galactomannan gelling agent comprised of a liquid solvent comprising a mixture of water, triethanolamine, a polyhydroxyl containing compound and isopropyl alcohol, an organotitanate chelate or an organozirconate chelate and aborate ion producing compound, said retarded cross-linking composition being present in said treating fluid in an amount in the range of from about 0.04% to about 1.0% by weight of water in said treating fluid; and a delayed gel breaker for causing said viscous treating fluid to break into a thin fluid present in said treating fluid in an amount in the range of from about 0.01% to about 2.5% by weight of water in said treating fluid.

U.S. Pat. No. 5,217,632 disclosed a boron zirconium chelates are prepared by forming a mixture of ammonium hydroxide, water soluble amines, sodium or potassium zirconium alpha hydroxy carboxylates selected from lactates, citrates, tartrates, glycolates, maliates, saccharates, gluconates, glycerates and mandelates, with polyols such as glycerin, erythritol, arabitol, xylitol, sorbitol, dulcitol, mannitol, inositol, monosaccharides and disaccharides and with water. This mixture is blended and then boric acid or borax as a source of boron is added and the pH is adjusted using inorganic or organic bases and/or inorganic carbonates and bicarbonates. The boron zirconium chelate solutions contain 0.1-3.0% by weight $ZrO_2$, 5-25% by weight polyols; 2-20% by weight of $B_2O_3$ with a weight ratio of $B_2O_3:ZrO_2$ between 5:1 and 20:1. The pH is maintained within the range 7.0-10.0.

Although these systems include borates and zirconates, these system also suffer from certain disadvantages such as non-uniform cross-linking, non-uniform cross-link stability, and other disadvantages. Thus, there is a need in the art for a two-component cross-linking system that overcomes these disadvantages.

SUMMARY OF THE INVENTION

The present invention provides a cross-linking composition for hydratable polymer including a reaction product of a transition metal alkoxide and a borate compound or a borate generating compound. The cross-linking system is designed to cross-link a hydratable polymer or mixture of hydratable polymers to produce a cross-linked polymeric material having improved cross-link uniformity, cross-link stability and rate of cross-link formation. The transition metal is selected from the group consisting of Ti, Zr, Hf and mixtures and combinations thereof. The reaction products can be designed with a desired cross-linking delay and at the same time improve cross-link uniformity and stability.

The present invention provides a fracturing fluid including a hydratable polymer system and a cross-linking system having a reaction product of a transition metal alkoxide and a borate compound or a borate generating compound. The cross-linking system is designed to cross-link the hydratable polymer(s) in the hydratable polymer system to produce a cross-linked polymeric material having improved cross-link uniformity, cross-link stability and rate of cross-link formation.

The present invention provides a method for cross-linking a hydratable polymer system including the step of adding an effective amount of a cross-linking system including a borate generating compound and a transition metal alkoxide or alkanolate (these terms are used interchangeably and represent the group —OR, where R is a carbyl group). The effective amount is sufficient to cross-link the hydratable polymer in the hydratable polymer system to a desired degree, where the cross-linking system results in shorter viscosity build up times compared to other boron-zirconium cross-linking systems and has improved cross-link uniformity, cross-link stability and rate of cross-link formation. The transition metal is selected from the group consisting of Ti, Zr, Hf and mixtures and combinations thereof.

The present invention provides a method for fracturing a formation including the step of injecting a fracturing fluid including a hydratable polymer system and a cross-linking system having a reaction product of a transition metal alkoxide and a borate compound or a borate generating compound in a formation under fracturing conditions.

The present invention provides a method for fracturing a formation including the step of injecting a fracturing fluid including a hydratable polymer system and a cross-linking system having a reaction product of a transition metal alkoxide and a borate compound or a borate generating compound in a formation under fracturing conditions. During fracturing, a breaker is injected into the formation to break the cross-links. After breaking, a proppant fluid including a proppant is injected into the formation to hold open a portion of the fractures formed in the fracturing step.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
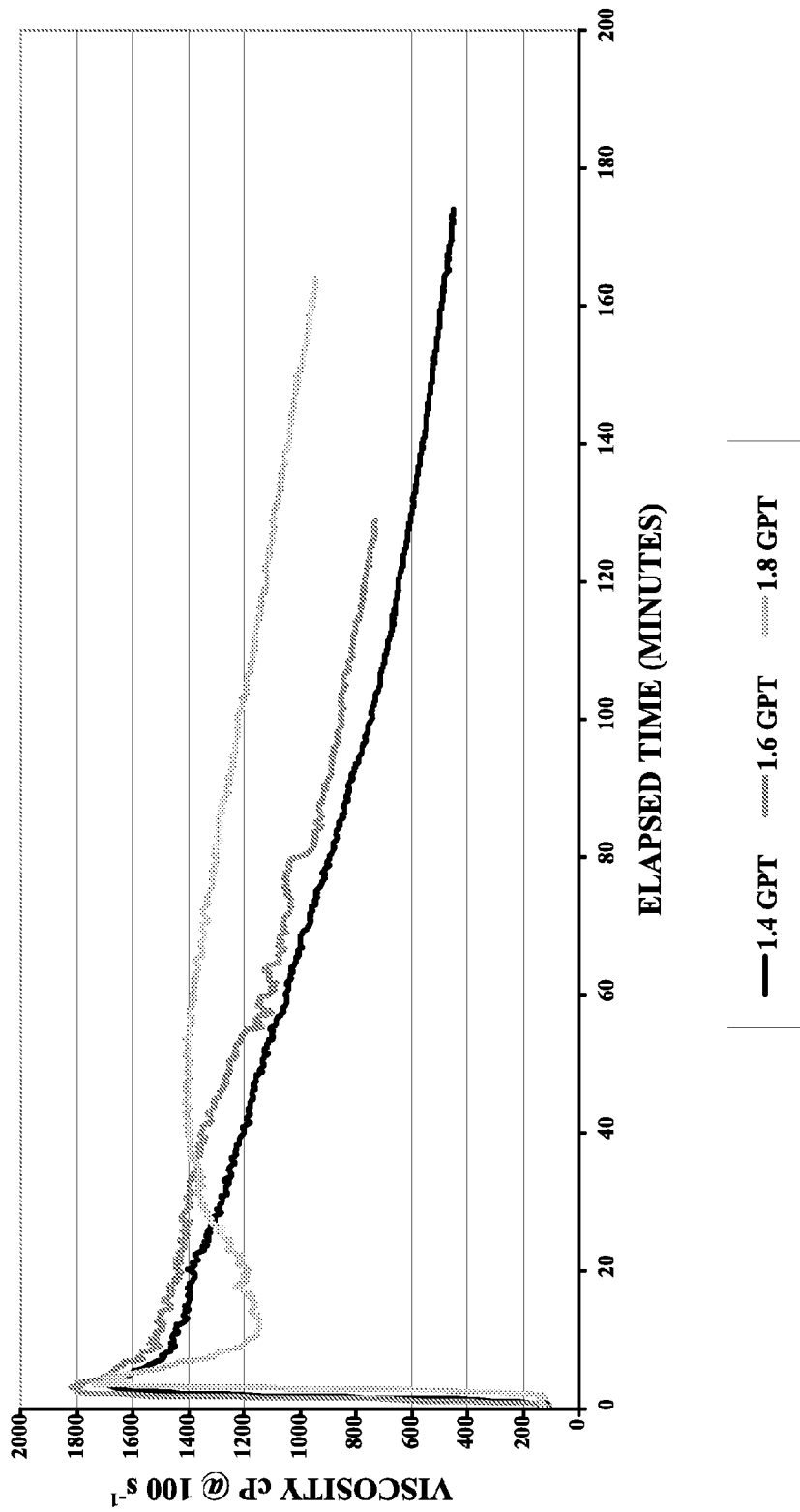
FIG. 1A depict a graph of 300° F. viscosity testing of TLF-10086 at varying loadings.

The inventors have found that a new cross-linking system can be produced, where the cross-linking agent is a reaction product of a borate-generating compound and a zirconium alkoxide. The mole ratio of boron to zirconium can be tuned to afford a desired cross-link density and a desired cross-linking delay time. The inventors have found that the reaction products of this invention produce cross-linked polymeric systems that have improved uniformity of cross-linking at a given cross-link density and result in a faster cross-linking process compared to other boron-zirconium cross-linking systems. The inventors have found that these borate generating compound/zirconium alkoxide reaction products are ideally suited for use in fracturing fluids, where cross-linking rate and cross-linking uniformity are critical in controlling fracturing fluid properties and efficiencies. The cross-linking systems of this invention can be used in any fracturing systems. The inventors have found that the cross-linking systems of this invention are especially well suited for high pH fracturing systems.

The present invention broadly relates to a cross-linking composition for hydratable polymer including a reaction product of a transition metal alkoxide and a borate compound or a borate generating compound. The cross-linking system is designed to cross-link a hydratable polymer or mixture of hydratable polymers to produce a cross-linked polymeric material having improved cross-link uniformity, cross-link stability and rate of cross-link formation. The transition metal is selected from the group consisting of Ti, Zr Hf and mixtures and combinations thereof.

The present invention broadly relates to fracturing fluid including a hydratable polymer system and a cross-linking system of this invention and to method for fracturing a formation using a fracturing fluid including a hydratable polymer system and a cross-linking system.

Cross-Linking System Compositional Ranges

The cross-linking compositions of this invention generally have a mole ratio of a borate or a borate generating compound and a transition metal alkoxide between about 10:1 and about 1:10. In certain embodiments, the mole ratio is between about 5:1 and about 1:5. In other embodiments, the mole ratio is between about 4:1 and 1:4. In other embodiments, the mole ratio is between about 3:1 and 1:3. In other embodiments, the mole ratio is between about 2:1 and 1:2. And, in other embodiments, the mole ratio is about 1:1. The exact mole ratio of the reaction product will depend somewhat on the conditions and system to which the composition is to be used as will be made more clear herein. While the cross-linking systems of this invention includes at least one cross-linking agent of this invention, the systems can also include one or more conventional cross-linking agents many of which are listed herein below.

Fracturing Fluid Compositional Ranges

The cross-linking system of this invention is generally used in and amount between about 0.1 GAL/MBAL (gallons per thousand gallons) and about 5.0 GAL/MGAL. In certain embodiments, the cross-linking system is used in an amount between about 0.5 GAL/MGAL and about 4.0 GAL/MGAL. In other embodiments, the cross-linking system is used in an amount between about 0.7 GAL/MGAL and about 3.0 GAL/MGAL. In other embodiments, the cross-linking system is used in an amount between about 0.8 GAL/MGAL and about 2.0 GAL/MGAL. In other embodiments, the cross-linking system is used in an amount between about 1.0 GAL/MGAL and about 5.0 GAL/MGAL. In other embodiments, the cross-linking system is used in an amount between about 1.0 GAL/MGAL and about 4.0 GAL/MGAL. In other embodiments, the cross-linking system is used in an amount between about 1.0 GAL/MGAL and about 3.0 GAL/MGAL. In other embodiments, the cross-linking system is used in an amount between about 1.0 GAL/MGAL and about 2.0 GAL/MGAL.

Suitable Reagents

Alkoxides or Alkanolates

Suitable alkoxides used in the metal alkoxides that are reacted with the borate or borate forming reagent include, without limitation, a linear or branched, saturated or unsaturated carbyl group bonded to an oxygen atom of the general formula OR, where R is the carbyl group. The carbyl group includes from 1 to 40 carbon atoms and sufficient hydrogen atoms to satisfy the valence requirement, where one or more carbon atom can be replaced by B, N, O, Si, S, P, Ge, Ga or the like, and one or more hydrogen atoms are replaced with monovalent atoms or group including F, Cl, Br, I, OH, SH, $NH_2$, NR'H, $NR'_2$, COOR, CHO, $CONH_2$, CONR'H, $CONR'_2$, or the like. Exemplary alkoxides include, without limitation, methoxide, ethoxide, propoxide, isopropoxide, butoxide, isobutoxide, t-butoxide, pentoxide, isopentoxide, neo-pentoxide, six carbon atom alkoxides, seven carbon atom alkoxides, eight carbon atom alkoxides, up to forty carbon atom alkoxides.

Suitable metal alkoxide for use in this invention include, without limitation, MOR, where M is selected from the group consisting of Ti, Zr, Hf and mixtures and combinations thereof and R a carbyl group as defined above.

Hydratable Polymers

Suitable hydratable polymers that may be used in embodiments of the invention include any of the hydratable polysaccharides which are capable of forming a gel in the presence of at least one cross-linking agent of this invention and any other polymer that hydrates upon exposure to water or an aqueous solution capable of forming a gel in the presence of at least one cross-linking agent of this invention. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art. Other examples of such polymer include, without limitation, guar gums, high-molecular weight polysaccharides composed of mannose and galactose sugars, or guar derivatives such as hydropropyl guar (HPG), carboxymethyl guar (CMG). carboxymethylhydropropyl guar (CMHPG), hydroxyethylcellulose (HEC), hydroxypropylcellulose (HPC), carboxymethylhydroxyethylcellulose (CMHEC), xanthan, scleroglucan, polyacrylamide, polyacrylate polymers and copolymers. Other examples of suitable hydratable polymers are set forth herein.

pH Modifiers

Suitable pH modifiers for use in this invention include, without limitation, alkali hydroxides, alkali carbonates, alkali bicarbonates, alkaline earth metal hydroxides, alkaline earth metal carbonates, alkaline earth metal bicarbonates, rare earth metal carbonates, rare earth metal bicarbonates, rare earth metal hydroxides, amines, hydroxylamines ($NH_2OH$), alkylated hydroxyl amines ($NH_2OR$, where R is a carbyl group having from 1 to about 30 carbon atoms or heteroatoms —O or N), and mixtures or combinations thereof. Preferred pH modifiers include NaOH, KOH, $Ca(OH)_2$, CaO, $Na_2CO_3$, $KHCO_3$, $K_2CO_3$, $NaHCO_3$, MgO, $Mg(OH)_2$ and mixtures or combinations thereof. Preferred amines include triethylamine, triproplyamine, other trialkylamines, bis hydroxyl ethyl ethylenediamine (DGA), bis hydroxyethyl diamine 1-2 dimethylcyclohexane, or the like or mixtures or combinations thereof.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., Na, K or $NH_4^+$ salts of EDTA; Na, K or $NH_4^-$ salts of NTA; Na, K or $NH_4^-$ salts of Erythorbic acid; Na, K or $NH_4^+$ salts of thioglycolic acid (TGA); Na, K or $NH_4^+$ salts of Hydroxy acetic acid; Na, K or $NH_4^+$ salts of Citric acid; Na, K or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaeryithrol, neopentyl glycol or the like; Tris & Tetra hydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or C10 to C24 amines or monohalogenated alkyl and aryl chlorides; quaternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus–Nitrilotriacetamide available from Clearwater International, LLC of Houston, Tex.

Fracturing Fluids

Generally, a hydraulic fracturing treatment involves pumping a proppant-free viscous fluid, or pad, usually water with some fluid additives to generate a high viscosity, into a well faster than the fluid can escape into the formation so that the pressure rises and the formation rock breaks, creating artificial fracture and/or enlarging existing fracture. After fracturing the formation, a propping agent such as sand is added to the fluid to form a slurry that is pumped into the newly formed fractures in the formation to prevent them from closing or collapsing when the pumping pressure is released. The proppant transport ability of a base fluid depends on the type of viscosifying additives added to the water base.

Water-base fracturing fluids with water-soluble polymers added to make a viscosified solution are widely used in the art of fracturing. Since the late 1950s, more than half of the fracturing treatments are conducted with fluids comprising guar gums, high-molecular weight polysaccharides composed of mannose and galactose sugars, or guar derivatives such as hydropropyl guar (HPG), hydroxypropylcellulose (HPC), carboxymethyl guar (CMG) carboxymethylhydropropyl guar (CMHPG). To increase the effective molecular weight of these hydratable polymers and to make them better suited for use in high-temperature wells, a cross-linking agent of this invention is used.

To a lesser extent, cellulose derivatives such as hydroxyethylcellulose (HEC) or hydroxypropylcellulose (HPC) and carboxymethylhydroxyethylcellulose (CMHEC) are also used, with or without cross-linkers. Xanthan and scleroglucan, two biopolymers, have been shown to have excellent proppant-suspension ability even though they are more expensive than guar derivatives and therefore used less frequently. Polyacrylamide and polyacrylate polymers and copolymers are used typically for high-temperature applications or friction reducers at low concentrations for all temperatures ranges.

Polymer-free, water-base fracturing fluids can be obtained using viscoelastic surfactants. These fluids are normally prepared by mixing in appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

Cationic viscoelastic surfactants—typically consisting of long-chain quaternary ammonium salts such as cetyltrimethylammonium bromide (CTAB)—have been so far of primarily commercial interest in wellbore fluid. Common reagents that generate viscoelasticity in the surfactant solutions are salts such as ammonium chloride, potassium chloride, sodium chloride, sodium salicylate and sodium isocyanate and non-ionic organic molecules such as chloroform. The electrolyte content of surfactant solutions is also an important control on their viscoelastic behavior. Reference is made for example to U.S. Pat. No. 4,695,389, U.S. Pat. No. 4,725,372, U.S. Pat. No. 5,551,516, U.S. Pat. No. 5,964,295, and U.S. Pat. No. 5,979,557. However, fluids comprising this type of cationic viscoelastic surfactants usually tend to lose viscosity at high brine concentration (10 pounds per gallon or more). Therefore, these fluids have seen limited use as gravel-packing fluids or drilling fluids, or in other applications requiring heavy fluids to balance well pressure. Anionic viscoelastic surfactants are also used.

It is also known from International Patent Publication WO 98/56497, to impart viscoelastic properties using amphoteric/zwitterionic surfactants and an organic acid, salt and/or inorganic salt. The surfactants are for instance dihydroxyl alkyl glycinate, alkyl ampho acetate or propionate, alkyl betaine, alkyl amidopropyl betaine and alkylamino mono- or di-propionates derived from certain waxes, fats and oils. The surfactants are used in conjunction with an inorganic water-soluble salt or organic additives such as phthalic acid, salicylic acid or their salts. Amphoteric/zwitterionic surfactants, in particular those comprising a betaine moiety are useful at temperature up to about 150° C. and are therefore of particular interest for medium to high temperature wells. However, like the cationic viscoelastic surfactants mentioned above, they are usually not compatible with high brine concentration.

According to an embodiment of the invention, the treatment consists in alternating viscoelastic-base fluid stages (or a fluid having relatively poor proppant capacity, such as a polyacrylamide-based fluid, in particular at low concentration) with stages of compositions of this invention. In certain embodiments, the pumping rate is kept constant for the different stages but the proppant-transport ability may be also improved (or alternatively degraded) by reducing (or alternatively increasing) the pumping rate.

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

"Waterfrac" treatments employ the use of low cost, low viscosity fluids in order to stimulate very low permeability reservoirs. The results have been reported to be successful (measured productivity and economics) and rely on the mechanisms of asperity creation (rock spalling), shear displacement of rock and localized high concentration of proppant to create adequate conductivity. It is the last of the three mechanisms that is mostly responsible for the conductivity obtained in "waterfrac" treatments. The mechanism can be described as analogous to a wedge splitting wood.

Viscous well treatment fluids are commonly used in the drilling, completion, and treatment of subterranean formations penetrated by wellbores. A viscous well treatment fluid is generally composed of a polysaccharide or synthetic polymer in an aqueous solution which is cross-linked by a cross-linking agent of this invention. Examples of well treatments in which metal-cross-linked polymer systems of this invention are used are hydraulic fracturing, gravel packing operations, water blocking, and other well completion operations.

Hydraulic fracturing techniques are widely employed to enhance oil and gas production from subterranean formations. During hydraulic fracturing, fluid is injected into a well bore under high pressure. Once the natural reservoir pressures are exceeded, the fracturing fluid initiates a fracture in the formation which generally continues to grow during pumping. As the fracture widens to a suitable width during the course of the treatment, a propping agent is then also added to the fluid. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives. Employing cross-linking agents of this invention can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In order for the treatment to be successful, it is preferred that the fluid viscosity eventually diminish to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation under the influence of formation fluids. This viscosity reduction or conversion is referred to as "breaking" and can be accomplished by incorporating chemical agents, referred to as "breakers," into the initial gel.

Certain gels of fracturing fluids, such as those based upon guar polymers, undergo a natural break without the intervention of a breaking agent. However, the breaking time for such gelled fluids generally is excessive and impractical, being somewhere in the range from greater than 24 hours to in excess of weeks, months, or years depending on reservoir conditions. Accordingly, to decrease the break time of gels used in fracturing, chemical agents are usually incorporated into the gel and become a part of the gel itself. Typically, these agents are either oxidants or enzymes which operate to degrade the polymeric gel structure. Most degradation or "breaking" is caused by oxidizing agents, such as persulfate salts (used either as is or encapsulated), chromous salts, organic peroxides or alkaline earth or zinc peroxide salts, or by enzymes.

In addition to the importance of providing a breaking mechanism for the gelled fluid to facilitate recovery of the fluid and to resume production, the timing of the break is also of great importance. Gels which break prematurely can cause suspended proppant material to settle out of the gel before being introduced a sufficient distance into the produced fracture. Premature breaking can also lead to a premature reduction in the fluid viscosity, resulting in a less than desirable fracture width in the formation causing excessive injection pressures and premature termination of the treatment.

On the other hand, gelled fluids which break too slowly can cause slow recovery of the fracturing fluid from the produced fracture with attendant delay in resuming the production of formation fluids and severely impair anticipated hydrocarbon production. Additional problems may occur, such as the tendency of proppant to become dislodged from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment. Gels useful in this regard include those disclosed in U.S. Pat. Nos. 3,960,736; 5,224,546; 6,756,345; and 6,793,018, incorporated herein by reference.

Fracturing fluid compositions of this invention comprise a hydrocarbon slurry comprising a hydrocarbon base fluid, a hydrocarbon soluble polymer and particulate materials and other additives, a solvent, a polymer soluble or hydratable in the solvent, at least one cross-linking agent of this invention, an inorganic breaking agent, an optional ester compound and a choline carboxylate. Preferably, the solvent includes water, and the polymer is hydratable in water. The solvent may be an aqueous potassium chloride solution. The inorganic breaking agent may be a metal-based oxidizing agent, such as an alkaline earth metal or a transition metal. The inorganic breaking agent may be magnesium peroxide, calcium peroxide, or zinc peroxide. The ester compound may be an ester of a polycarboxylic acid. For example, the ester compound may be an ester of oxalate, citrate, or ethylene diamine tetraacetate. The ester compound having hydroxyl groups can also be acetylated. An example of this is that citric acid can be acetylated to form acetyl triethyl citrate. A presently preferred ester is acetyl triethyl citrate. The hydratable polymer may be a water soluble polysaccharide, such as galactomannan, cellulose, or derivatives thereof. The cross-linking systems include at least the cross-linking agents of this invention, but also may other cross-linking agents such as borate, titanate, or zirconium-containing cross-linking agents. For example, the other cross-linking agents can be sodium borate×$H_2O$ (varying waters of hydration), boric acid, borate cross-linkers (a mixture of a titanate constituent, preferably an organotitanate constituent, with a boron constituent. The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base. The boron constituent can be selected from the group consisting of boric acid, sodium tetraborate, and mixtures thereof. These are described in U.S. Pat. No. 4,514,309), borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

In another aspect, the invention relates to a well treatment fluid composition. The composition includes a solvent, a polymer soluble or hydratable in the solvent, at least one cross-linking agent of this invention, an alkaline earth metal or a transition metal-based breaking agent, an optional ester of a carboxylic acid and choline carboxylate. The breaking agent may be magnesium peroxide, calcium peroxide, or zinc peroxide. The solvent may include water, and the polymer is hydratable in water. The solvent may be an aqueous potassium chloride solution. The hydratable polymer may be a polysaccharide.

In still another aspect, the invention relates to a method of treating a subterranean formation. The method comprises: formulating a fracturing fluid comprising a solvent, a polymer soluble or hydratable in the solvent, at least one cross-linking agent of this invention, an inorganic breaking agent, a choline carboxylate and an optional ester compound; and injecting the fracturing fluid into a bore hole to contact at least a part of the formation by the fracturing fluid under a sufficient pressure to fracture the formation. The fracturing fluid has a viscosity that changes in response to a condition. The method may further comprise removing the fracturing fluid after the viscosity of the fracturing fluid is reduced. In some embodiments, the method may further comprise injecting a proppant into the formation. The proppant may be injected into the formation with the fracturing fluid. The fracturing fluid may have a pH at or above about 7. Preferably, the fracturing fluid should have a pH in the range of about 8 to about 12. The inorganic breaking agent may be a metal-based oxidizing agent. The metal may be an alkaline earth metal or a transition metal. The inorganic breaking agent may be magnesium peroxide, calcium peroxide, or zinc peroxide. The optional ester compound may be an ester of an polycarboxylic acid, such as an ester of oxalate, citrate, or ethylene diamine tetraacetate. Preferably, the solvent includes water, and the polymer is a water soluble polysaccharide, such as galactomannan, cellulose, or derivatives thereof. The solvent may be an aqueous potassium chloride solution. The cross-linking system, which includes at least one cross-linking agent of this invention, may also include borate, titanate, or zirconium-containing compounds. The fracturing fluid can further comprise sodium thiosulfate.

Embodiments of the invention provide a well treatment fluid composition and a method of using the fluid composition to treat subterranean formations. The well treatment fluid composition can be used in hydraulic fracturing as a fracturing fluid, gravel packing operations, water blocking, temporary plugs for purposes of wellbore isolation and/or fluid loss control and other well completion operations. Most well treatment fluids are aqueous, although non-aqueous fluids may be formulated and used as well.

The well treatment fluid composition comprises a solvent (such as water), a polymer soluble or hydratable in the solvent, at least one cross-linking agent of this invention, an inorganic breaking agent, a choline carboxylate of and an optional ester compound. Optionally, the well treatment fluid composition may further include various other fluid additives, such as pH buffers, biocides, stabilizers, propping agents (i.e., proppants), mutual solvents, and surfactants designed to prevent emulsion with formation fluids, to reduce surface tension, to enhance load recovery, and/or to foam the fracturing fluid. The well treatment fluid composition may also contain one or more salts, such as potassium chloride, magnesium chloride, sodium chloride, calcium chloride, tetramethyl ammonium chloride, and mixtures thereof. It is found that a fracturing fluid made in accordance with embodiments of the invention exhibits reduced or minimal premature breaking and breaks completely or substantially completely after a well treatment is finished.

"Premature breaking" as used herein refers to a phenomenon in which a gel viscosity becomes diminished to an undesirable extent before all of the fluid is introduced into the formation to be fractured. Thus, to be satisfactory, the gel viscosity should preferably remain in the range from about 50% to about 75% of the initial viscosity of the gel for at least two hours of exposure to the expected operating temperature. Preferably the fluid should have a viscosity in excess of 100 centipoise (cP) at 100 sec$^{-1}$ while injection into the reservoir as measured on a Fann 50° C. viscometer in the laboratory.

"Complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-cross-linked gel is one whose viscosity is about 10 cP or less as measured on a Model 35 Fann viscometer having a RIBI rotor and bob assembly rotating at 300 rpm.

An aqueous fracturing fluid may be prepared by blending a hydratable polymer with an aqueous base fluid. The base aqueous fluid can be, for example, water or brine. Any suitable mixing apparatus may be used for this procedure. In the case of batch mixing, the hydratable polymer and aqueous fluid are blended for a period of time which is sufficient to form a hydrated sol.

The hydratable polymer may be present in the fluid in concentrations ranging from about 0.10% to about 5.0% by weight of the aqueous fluid. A preferred range for the hydratable polymer is about 0.20% to about 0.80% by weight.

Other suitable cross-linking agent for use with at least one cross-linking agent of this invention can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable cross-linking agents is borates as described, for example, in U.S. Pat. No. 4,514,309. The selection of an appropriate cross-linking agent depends upon the type of treatment to be performed and the hydratable polymer to be used. The amount of the cross-linking agent used also depends upon the well conditions and the type of treatment to be effected, but is generally in the range of from about 10 ppm to about 1000 ppm of metal ion of the cross-linking agent in the hydratable polymer fluid. In some applications, the aqueous polymer solution is cross-linked immediately upon addition of the cross-linking agent to form a highly viscous gel. In other applications, the reaction of the cross-linking agent can be retarded so that viscous gel formation does not occur until the desired time.

The pH of an aqueous fluid which contains a hydratable polymer can be adjusted if necessary to render the fluid compatible with at least one cross-linking agent of this invention. Preferably, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. Preferably, the pH is kept neutral or basic, i.e., from about 7 to about 14, more preferably between about 8 to about 12.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219.

Suitable ester compounds include any ester which is capable of assisting the breaker in degrading the viscous fluid in a controlled manner, i.e., providing delayed breaking initially and substantially complete breaking after well treatment is completed. An ester compound is defined as a compound that includes one or more carboxylate groups: R—COO—, wherein R is phenyl, methoxyphenyl, alkylphenyl, $C_1$-$C_{11}$ alkyl, $C_1$-$C_{11}$ substituted alkyl, substituted phenyl, or other organic radicals. Suitable esters include, but are not limited to, diesters, triesters, etc.

An ester is typically formed by a condensation reaction between an alcohol and an acid by eliminating one or more water molecules. Preferably, the acid is an organic acid, such as a carboxylic acid. A carboxylic acid refers to any of a family of organic acids characterized as polycarboxylic acids and by the presence of more than one carboxyl group. In additional to carbon, hydrogen, and oxygen, a carboxylic acid may include heteroatoms, such as S, N, P, B, Si, F, Cl, Br, and I. In some embodiments, a suitable ester compound is an ester of oxalic, malonic, succinic, malic, tartaric, citrate, phthalic, ethylenediaminetetraacetic (EDTA), nitrilotriacetic, phosphoric acids, etc. Moreover, suitable esters also include the esters of glycolic acid. The alkyl group in an ester that comes from the corresponding alcohol includes any alkyl group, both substituted or unsubstituted. Preferably, the alkyl group has one to about ten carbon atoms per group. It was found that the number of carbon atoms on the alkyl group affects the water solubility of the resulting ester. For example, esters made from $C_1$-$C_2$ alcohols, such as methanol and ethanol, have relatively higher water solubility. Thus, application temperature range for these esters may range from about 120° F. to about 250° F. (about 49° C. to about 121° C.). For higher temperature applications, esters formed from $C_3$-$C_{10}$ alcohols, such as n-propanol, butanol, hexanol, and cyclohexanol, may be used. Of course, esters formed from $C_{11}$ or higher alcohols may also be used. In some embodiments, mixed esters, such as acetyl methyl dibutyl citrate, may be used for high temperature applications. Mixed esters refer to those esters made from polycarboxylic acid with two or more different alcohols in a single condensation reaction. For example, acetyl methyl dibutyl citrate may be prepared by condensing citric acid with both methanol and butanol and then followed by acylation.

Specific examples of the alkyl groups originating from an alcohol include, but are not limited to, methyl, ethyl, propyl, butyl, iso-butyl, 2-butyl, t-butyl, benzyl, p-methoxybenzyl, m-methoxybenzyl, chlorobenzyl, p-chlorobenzyl, phenyl, hexyl, pentyl, etc. Specific examples of suitable ester compounds include, but are not limited to, triethyl phosphate, diethyl oxalate, dimethyl phthalate, dibutyl phthalate, diethyl maleate, diethyl tartrate, 2-ethoxyethyl acetate, ethyl acetylacetate, triethyl citrate, acetyl triethyl citrate, tetracyclohexyl EDTA, tetra-1-octyl EDTA, tetra-n-butyl EDTA, tetrabenzyl EDTA, tetramethyl EDTA, etc. Additional suitable ester compounds are described, for example, in the following U.S. Pat. Nos. 3,990,978; 3,960,736; 5,067,556; 5,224,546; 4,795,574; 5,693,837; 6,054,417; 6,069,118; 6,060,436; 6,035,936; 6,147,034; and 6,133,205.

When an ester of a polycarboxylic acid is used, total esterification of the acid functionality is preferred, although a partially esterified compound may also be used in place of or in addition to a totally esterified compound. In these embodiments, phosphate esters are not used alone. A phosphate ester refers to a condensation product between an alcohol and a phosphorus acid or a phosphoric acid and metal salts thereof. However, in these embodiments, combination of a polycarboxylic acid ester with a phosphate ester may be used to assist the degradation of a viscous gel.

When esters of polycarboxylic acids, such as esters of oxalic, malonic, succinic, malic, tartaric, citrate, phthalic, ethylenediaminetetraacetic (EDTA), nitrilotriacetic, and other carboxylic acids are used, it was observed that these esters assist metal based oxidizing agents (such as alkaline earth metal or zinc peroxide) in the degradation of fracturing fluids. It was found that the addition of 0.1 gal/Mgal (0.1 l/m$^3$) to 5 gal/Mgal (5 l/m$^3$) of these esters significantly improves the degradation of the fracturing fluid. More importantly, the degradation response is delayed, allowing the fracturing fluid ample time to create the fracture and place the proppant prior to the degradation reactions. The delayed reduction in viscosity is likely due to the relatively slow hydrolysis of the ester, which forms polycarboxylate anions as hydrolysis products.

These polycarboxylate anions, in turn, improve the solubility of metal based oxidizing agents by sequestering the metal associated with the oxidizing agents. This may have promoted a relatively rapid decomposition of the oxidizing agent and caused the fracturing fluid degradation.

Generally, the temperature and the pH of a fracturing fluid affects the rate of hydrolysis of an ester. For downhole operations, the bottom hole static temperature ("BHST") cannot be easily controlled or changed. The pH of a fracturing fluid usually is adjusted to a level to assure proper fluid performance during the fracturing treatment. Therefore, the rate of hydrolysis of an ester could not be easily changed by altering BHST or the pH of a fracturing fluid. However, the rate of hydrolysis may be controlled by the amount of an ester used in a fracturing fluid. For higher temperature applications, the hydrolysis of an ester may be retarded or delayed by dissolving the ester in a hydrocarbon solvent. Moreover, the delay time may be adjusted by selecting esters that provide more or less water solubility. For example, for low temperature applications, polycarboxylic esters made from low molecular weight alcohols, such as methanol or ethanol, are recommended. The application temperature range for these esters could range from about 120° F. to about 250° F. (about 49° C. to about 121° C.). On the other hand, for higher temperature applications or longer injection times, esters made from higher molecular weight alcohols should preferably be used. The higher molecular weight alcohols include, but are not limited to, $C_3$-$C_6$ alcohols, e.g., n-propanol, hexanol, and cyclohexanol.

In some embodiments, esters of citric acid are used in formulating a well treatment fluid. A preferred ester of citric acid is acetyl triethyl citrate, which is available under the trade name Citraflex A2 from Morflex, Inc., Greensboro, N.C.

Propping agents or proppants are typically added to the fracturing fluid prior to the addition of at least one cross-linking agent of this invention. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

The well treatment fluid composition in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fluid composition is to use it as a fracturing fluid. Accordingly, embodiments of the invention also provide a method of treating a subterranean formation. The method includes formulating a fracturing fluid comprising an aqueous fluid, a hydratable polymer, at least one cross-linking agent of this invention, an inorganic breaking agent, and an ester compound; and injecting the fracturing fluid into a bore hole to contact at least a part of the formation by the fracturing fluid under a sufficient pressure to fracture the formation. Initially, the viscosity of the fracturing fluid should be maintained above at least 200 cP at 40 $sec^{-1}$ during injection and, afterwards, should be reduced to less than 200 cP at 40 $sec^{-1}$. After the viscosity of the fracturing fluid is lowered to an acceptable level, at least a portion of the fracturing fluid is removed from the formation. During the fracturing process, a proppant can be injected into the formation simultaneously with the fracturing fluid. Preferably, the fracturing fluid has a pH around or above about 7, more preferably in the range of about 8 to about 12.

It should be understood that the above-described method is only one way to carry out embodiments of the invention. The following U.S. patents disclose various techniques for conducting hydraulic fracturing which may be employed in embodiments of the invention with or without modifications: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt $NaCO_3$, NaCl, KCl, etc.) has been added. The liquid carrier is preferably present in an amount of at least about 80% by weight. Specific examples of the amount of liquid carrier include 80%, 85%, 90%, and 95% by weight. The carrier liquid can be a VAS gel.

The pH of the fluid can generally be any pH compatible with downhole formations. The pH is presently preferred to be about 6.5 to about 10.0. The pH can be about the same as the formation pH.

The surfactant can generally be any surfactant. The surfactant is preferably viscoelastic. The surfactant is preferably anionic. The anionic surfactant can be an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms.

The anionic surfactant can have the chemical formula $R_1CON(R_2)CH_2X$, wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The surfactant can generally be present in any weight percent concentration. Presently preferred concentrations of surfactant are about 0.1% to about 15% by weight. A presently more preferred concentration is about 0.5% to about 6% by weight. Laboratory procedures can be employed to determine the optimum concentrations for any particular situation.

The amphoteric polymer can generally be any amphoteric polymer. The amphoteric polymer can be a nonionic water-soluble homopolysaccharide or an anionic water-soluble polysaccharide. The polymer can generally have any molecular weight, and is presently preferred to have a molecular weight of at least about 500,000.

The polymer can be a hydrolyzed polyacrylamide polymer. The polymer can be a scleroglucan, a modified scleroglucan, or a scleroglucan modified by contact with glyoxal or glutaraldehyde. The scleroglucans are nonionic water-soluble homopolysaccharides, or water-soluble anionic polysaccharides, having molecular weights in excess of about 500,000, the molecules of which consist of a main straight chain formed of D-glucose units which are bonded by .beta.-1,3-bonds and one in three of which is bonded to a side D-glucose unit by means of a .beta.-1,6 bond. These polysaccharides can be obtained by any of the known methods in the art, such as fermentation of a medium based on sugar and inorganic salts under the action of a microorganism of Sclerotium type A. A more complete description of such scleroglucans and their preparations may be found, for example, in U.S. Pat. Nos. 3,301,848 and 4,561,985. In aqueous solutions, the scleroglucan chains are combined in a triple helix, which explains the rigidity of the biopolymer, and consequently its features of high viscosity-increasing power and resistance to shearing stress.

It is possible to use, as source of scleroglucan, the scleroglucan which is isolated from a fermentation medium, the product being in the form of a powder or of a more or less concentrated solution in an aqueous and/or aqueous-alcoholic solvent. Scleroglucans customarily used in applications in the petroleum field are also preferred according to the present invention, such as those which are white powders obtained by alcoholic precipitation of a fermentation broth in order to remove residues of the producing organism (mycelium, for example). Additionally, it is possible to use the liquid reaction mixture resulting from the fermentation and containing the scleroglucan in solution. According to the present invention, further suitable scleroglucans are the modified scleroglucan which result from the treatment of scleroglucans with a dialdehyde reagent (glyoxal, glutaraldehyde, and the like), as well as those described in U.S. Pat. No. 6,162,449 (.beta.-1,3-scleroglucans with a cross-linked 3-dimensional structure produced by Sclerotium rolfsii).

The polymer can be Aquatrol V (a synthetic compound which reduces water production problems in well production; described in U.S. Pat. No. 5,465,792), AquaCon (amoderate molecular weight hydrophilic terpolymer based on polyacrylamide capable of binding to formation surfaces to enhance hydrocarbon production; described in U.S. Pat. No. 6,228,812) and Aquatrol C (an amphoteric polymeric material). Aquatrol V, Aquatrol C, and AquaCon are commercially available from BJ Services Company.

The polymer can be a terpolymer synthesized from an anionic monomer, a cationic monomer, and a neutral monomer. The monomers used preferably have similar reactivities so that the resultant amphoteric polymeric material has a random distribution of monomers. The anionic monomer can generally be any anionic monomer. Presently preferred anionic monomers include acrylic acid, methacrylic acid, 2-acrylamide-2-methylpropane sulfonic acid, and maleic anhydride. The cationic monomer can generally be any cationic monomer. Presently preferred cationic monomers include dimethyl-diallyl ammonium chloride, dimethylamino-ethyl methacrylate, and allyltrimethyl ammonium chloride. The neutral monomer can generally be any neutral monomer. Presently preferred neutral monomers include butadiene, N-vinyl-2-pyrrolidone, methyl vinyl ether, methyl acrylate, maleic anhydride, styrene, vinyl acetate, acrylamide, methyl methacrylate, and acrylonitrile. The polymer can be a terpolymer synthesized from acrylic acid (AA), dimethyl diallyl ammonium chloride (DMDAC), and acrylamide (AM). The ratio of monomers in the terpolymer can generally be any ratio. A presently preferred ratio is about 1:1:1.

Another presently preferred amphoteric polymeric material (hereinafter "polymer 1") includes approximately 30% polymerized AA, 40% polymerized AM, and 10% polymerized DMDAC with approximately 20% free residual DMDAC which is not polymerized due to lower relative reactivity of the DMDAC monomer.

The fluid can further comprise one or more additives. The fluid can further comprise a base. The fluid can further comprise a salt. The fluid can further comprise a buffer. The fluid can further comprise a relative permeability modifier. The fluid can further comprise methylethylamine, monoethanolamine, triethylamine, triethanolamine, sodium hydroxide, potassium hydroxide, potassium carbonate, sodium chloride, potassium chloride, potassium fluoride, $KH_2PO_4$, or $K_2HPO_4$. The fluid can further comprise a proppant. Conventional proppants will be familiar to those skilled in the art and include sand, resin coated sand sintered bauxite and similar materials. The proppant can be suspended in the fluid.

Relative permeability modifiers can be added to the fluids to further improve water shut off properties. These compounds are polymers that are water-soluble and improve the leak-off viscosity of the fracturing fluid.

A specific example of a treating fluid is as follows: (a) 11% KCl by weight; (b) 2.5% surfactant by weight; (c) 1.6% buffer (potassium carbonate in water (45% by weight potassium carbonate)) by volume, and (d) 1.0% of 10% (by weight) Polymer 1 solution.

An additional embodiment of the invention involves the use of any of the above described fluids in a method of fracturing a subterranean formation. The method can comprise providing a fluid comprising a liquid carrier, a viscoelastic anionic surfactant, and an amphoteric polymer, pumping the fluid through a wellbore, and contacting the fluid and the subterranean formation to fracture the formation.

The fluid of the present invention may also be used as asphaltene-dispersing agents. Asphaltenes are constituents of crude oils, usually present as colloidal dispersions stabilized by resins in the oil. While examples of asphaltene-dispersing agents are know in the art (e.g., U.S. Pat. No. 5,948,237), the sarcosinate anionic surfactant of the invention in combination with RPM type materials produces a synergistic effect in this regard. Specifically, these compounds in combination form an excellent asphaltene-dispersant, thereby aiding in the cleaning of rocks, pipes, valves, conveying devices, and the like by removing heavy oil deposits and asphaltenes themselves.

The fluids of the invention can also be used as selective water control additives. The viscous fluids can be pumped into a water rich sector of a producing interval. Once placed, the gel viscosity will prevent formation water flow through that portion of the reservoir. On the other hand, gel pumped into the oil rich sector of the formation reservoir will immediately thin on contact with the oil contained within the reservoir. Consequently, oil production will be uninhibited while water flow will be preferentially stopped or significantly reduced.

For fracturing applications, the fluids of the invention are typically pumped downhole at or slightly above the formation pH. Preferably, when the fluids of the invention are used for water control purposes, the fluids are pumped downhole at about 3/10 of a pH unit less or more than the formation material pH depending on the anion portion of the salt used as counter cation. The fluid is thus pumped in a thinned state, reducing the friction pressure of the pumping job. Upon contacting the formation material, the pH of the fluid increases, resulting in complete gellation of the fluid at the formation location rather than at the well surface.

Various amine oxides have been used as surfactants to create foams and remove "intrusion fluids from wellbores," according to U.S. Pat. No. 3,303,896 and they have been used as foam stabilizers, according to U.S. Pat. No. 3,317,430. Certain amine oxides have also been used in combination with quaternary ammonium compounds as foaming and silt suspending agents. See, for example, U.S. Pat. No. 4,108,782 and U.S. Pat. No. 4,113,631. The use of amine oxide surfactants for chemical flooding enhanced oil recovery was described in a topical report by David K. Olsen in NIPER-417 (August 1989) for work performed for the US Department of Energy under cooperative agreement DE-FC22-83FE60149 by the National Institute for Petroleum and Energy Research. However, to Applicants' knowledge, the amine oxides have not been used to improve the properties of fracturing fluids and to promote rapid cleanup, or to enhance well production from a well stimulated by hydraulic fracturing.

Hydraulic fracturing of subterranean formations has long been established as an effective means to stimulate the production of hydrocarbon fluids from a wellbore. In hydraulic fracturing, a well stimulation fluid (generally referred to as a fracturing fluid or a "frac fluid") is injected into and through a wellbore and against the surface of a subterranean formation penetrated by the wellbore at a pressure at least sufficient to create a fracture in the formation. Usually a "pad fluid" is injected first to create the fracture and then a fracturing fluid, often bearing granular propping agents, is injected at a pressure and rate sufficient to extend the fracture from the wellbore deeper into the formation. If a proppant is employed, the goal is generally to create a proppant filled zone (aka, the proppant pack) from the tip of the fracture back to the wellbore. In any event, the hydraulically induced fracture is more permeable than the formation and it acts as a pathway or conduit for the hydrocarbon fluids in the formation to flow to the wellbore and then to the surface where they are collected. The methods of fracturing are well known and they may be varied to meet the user's needs, but most follow this general procedure (which is greatly overly simplified).

The fluids used as fracturing fluids have also been varied, but many if not most are aqueous based fluids that have been "viscosified" or thickened by the addition of a natural or synthetic polymer (cross-linked or uncross-linked). The carrier fluid is usually water or a brine (e.g., dilute aqueous solutions of sodium chloride and/or potassium chloride). The viscosifying polymer is typically a solvatable (or hydratable) polysaccharide, such as a galactomannan gum, a glycomannan gum, or a cellulose derivative. Examples of such polymers include guar, hydroxypropyl guar, carboxymethyl guar, carboxymethylhydroxyethyl guar, hydroxyethyl cellulose, carboxymethyl-hydroxyethyl cellulose, hydroxypropyl cellulose, xanthan, polyacrylamides and other synthetic polymers. Of these, guar, hydroxypropyl guar and carboxymethylhydroxyethyl guar are typically preferred because of commercial availability and cost performance.

In many instances, if not most, the viscosifying polymer is crosslinked with at least one cross-linking agent of this invention. The cross-linked polymer has an even higher viscosity and is even more effective at carrying proppant into the fractured formation. The borate ion has been used extensively as a crosslinking agent, typically in high pH fluids, for guar, guar derivatives and other galactomannans. See, for example, U.S. Pat. No. 3,059,909 and numerous other patents that describe this classic aqueous gel as a fracture fluid. Other cross-linking agents which can be used in conjunction with at least one cross-linking agent of this invention include, for example, titanium crosslinkers (U.S. Pat. No. 3,888,312), chromium, iron, aluminum, and zirconium (U.S. Pat. No. 3,301,723). Of these, the titanium and zirconium cross-linking agents are typically preferred. Examples of commonly used zirconium crosslinking agents include zirconium triethanolamine complexes, zirconium acetylacetonate, zirconium lactate, zirconium carbonate, and chelants of organic alphahydroxycorboxylic acid and zirconium. Examples of commonly used titanium crosslinking agents include titanium triethanolamine complexes, titanium acetylacetonate, titanium lactate, and chelants of organic alphahydroxycorboxylic acid and titanium.

Additional information on fracturing is found in the description by Janet Gulbis and Richard M. Hodge in Chapter 7 of the text "Reservoir Stimulation" published by John Wiley & Sons, Ltd, Third Edition, 2000 (Editors, Michael J. Economides and Kenneth G. Nolte), which is incorporated herein by reference. Some fracturing fluids have also been energized by the addition of a gas (e.g., nitrogen or carbon dioxide) to create a foam. See, for example, the pioneering work by Roland E. Blauer and Clarence J. Durborow in U.S. Pat. No. 3,937,283 ("Formation Fracturing with Stable Foam"). The rheology of the traditional water-base polymer solutions and also complex fluids, such as foams, can be and typically is modified and augmented by several additives to control their performance. Fluid loss additives are typically added to reduce the loss of fracturing fluids into the formation.

The problems associated with the loss of fracturing fluid to the formation are well known. For example, in 1978 Holditch reported: "The fluid injected during the fracturing treatment will leak off into the formation and will reduce the relative permeability to gas in the invaded region. Near the fracture, the permeability to gas will be reduced to zero." In addition, Holditch said: "In some cases, the injected fracturing fluid may reduce the formation permeability in the invaded zone." Stephen A. Holditch, SPE 7561 (Presented at the $53^{rd}$ Annual Fall Technical Conference and Exhibition of the Society of Petroleum Engineers of AIME, held in Houston, Tex., Oct. 1-3, 1978). The damage to the formation could be severe, and the practical so what of that is reduced flow of hydrocarbons, low production and poor economics on the well. While the state of the art has advanced substantially since Holditch reported on the problems associated with leak off of fracturing fluid, the problems remain the same. See, for example, Vernon G. Constien, George W. Hawkins, R. K. Prud'homme and Reinaldo Navarrete, Chapter 8 entitled "Performance of Fracturing Materials" and the other chapters on fracturing and well stimulation in "Reservoir Stimulation" published by John Wiley & Sons, Ltd, Third Edition, copyright Schlumberger 2000 (Editors, Michael J. Economides and Kenneth G. Nolte), the disclosure of which is incorporated herein by reference. These authors and others emphasize the importance of "cleanup" or "fracture cleanup" to optimize production of the hydrocarbon fluids from the well. The term "cleanup" or "fracture cleanup" refers to the process of removing the fracture fluid (without the proppant) from the fracture after the fracturing process has been completed. Techniques for promoting fracture cleanup often involved reducing the viscosity of the fracture fluid as much as practical so that it will more readily flow back toward the wellbore. So-called "breakers" have been used to reduce fluid viscosity in many instances. The breakers can be enzymes (oxidizers and oxidizer catalysts), and they may be encapsulated to delay their release. See, for example, U.S. Pat. No. 4,741,401

(Walles et al.), assigned to Schlumberger Dowell and incorporated herein by reference. Another technique to aid in the cleanup, albeit by a contrarian approach, is found in U.S. Pat. No. 6,283,212 (Hinkel and England), which is also assigned to Schlumberger Dowell and incorporated herein by reference.

Hydraulic fracturing is a primary tool for improving well productivity by placing or extending channels from the wellbore to the reservoir. This operation is essentially performed by hydraulically injecting a fracturing fluid into a wellbore penetrating a subterranean formation and forcing the fracturing fluid against the formation strata by pressure. The formation strata or rock is forced to crack and fracture. Proppant is placed in the fracture to prevent the fracture from closing and thus, provide improved flow of the recoverable fluid, i.e., oil, gas or water.

The proppant is thus used to hold the walls of the fracture apart to create a conductive path to the wellbore after pumping has stopped. Placing the appropriate proppant at the appropriate concentration to form a suitable proppant pack is thus critical to the success of a hydraulic fracture treatment.

Sand, resin-coated sand, and ceramic particles are the most commonly used proppants, though the literature, for instance U.S. Pat. No. 4,654,266, also mentions the used of walnut hull fragments coated with some bonding additives, metallic shots, or metal-coated beads—nearly spherical but having a passageways to improve their conductibility.

The proppant conductivity is affected principally by two parameters, the proppant pack width and the proppant pack permeability. To improve fracture proppant conductivity, typical approaches include high large diameter proppants. More generally, the most common approaches to improve proppant fracture performance include high strength proppants, large diameter proppants, high proppant concentrations in the proppant pack to obtain wider propped fractures, conductivity enhancing materials such as breakers, flow-back aides, fibers and other material that physically alter proppant packing, and use of non-damaging fracturing fluids such as gelled oils, viscoelastic surfactant based fluids, foamed fluids or emulsified fluids. It is also recognized that grain size, grain-size distribution, quantity of fines and impurities, roundness and sphericity and proppant density have an impact on fracture conductivity.

As mentioned above, the main function of the proppant is to keep the fracture open by overcoming the in-situ stress. Where the proppant strength is not high enough, the closure stress crushes the proppant, creating fines and reducing the conductivity. Sand is typically suitable for closure stresses of less than about 6000 psi (41 MPa), resin-coated sand may be used up to about 8000 psi (55 MPa). Intermediate-strength proppant typically consists of fused ceramic or sintered-bauxite and is used for closure stresses ranging between 5000 psi and 10000 psi (34 MPa to 69 MPa). High-strength proppant, consisting of sintered-bauxite with large amounts of corundum is used at closure stresses of up to about 14000 psi (96 MPa).

Permeability of a propped fracture increases as the square of the grain diameter. However, larger grains are often more susceptible to crush, have more placement problems and tend to be more easily invaded by fines. As the result, the average conductivity over the life of a well may be actually higher with smaller proppants.

In an effort to limit the flowback of particulate proppant materials placed into the formation, it was disclosed in U.S. Pat. No. 5,330,005 to add some fibrous material, mixed with the proppant material. It is believed that the fibers become concentrated into a mat or other three-dimensional framework, which holds the proppant thereby limiting its flowback. The fibers can be of glass, ceramic, carbon, natural or synthetic polymers or metal fibers. They have a length of typically about 2 to 30 mm and a diameter of between 10 and 100 micrometers. According to U.S. Pat. No. 5,908,073 the flowback is prevented through the use of fibrous bundles, made of from about 5 to about 200 individual fibers having lengths in the range of about 0.8 to about 2.5 mm and diameters in the range of about 10 to about 1000 micrometers. It has also known from U.S. Pat. No. 6,059,034 to add to blend the proppant material with a deformable particulate material. The deformable particles may have different shapes such as oval, cubic, bar-shaped, cylindrical, multi-faceted, irregular, tapered—but preferably with a maximum length-based ratio equal or less than 5, and are typically spherical plastic beads or composite particles comprising a non-deformable core and a deformable coating. In another embodiment claimed in U.S. Pat. No. 6,330,916, the particles may comprise ground or crushed materials such as nutshells, seed shells, fruit pits, and processed woods.

It should be emphasized that in all of the four above-mentioned U.S. patents, the proppant itself is constituted of essentially spherical particles—most typically sand—intermingled with a material that may be elongated. This reflects the general understanding of this art that angular grains fail at lower closure stresses, producing more fines and thus reducing fracture conductivity. On the other hand, round and uniform-sized grains result in higher loads before failure since stresses are more evenly distributed.

Adding fibers or fiber-like products to the products may contribute to a reduction of the proppant flowback—and consequently to a better packing of the proppant in the fracture. Additionally, they contribute to prevent fine migrations and consequently, to prevent a reduction of the proppant conductivity but there is still a need for a new type of proppant that will lead to higher conductivity.

According to the invention, the solid organic polymeric particulate matter composition is selected for its ultimate and delayed reactivity and/or degradation characteristics in providing the required gel breaking action and cleanup, it being required, of course, that its reactivity or degradation in the fluid suspension be sufficiently gradual, delayed, or retarded (delayed) that formation of a gel by the suspension is not significantly inhibited or the gelled suspension broken before the fracturing operation is carried out to the desired extent. That is, the solid organic polymeric particulate matter should not react with other components of the fluid or the particles to be removed and/or transported or the formation components, or decompose or degrade in the fluid suspension, at a rate faster than desired. The suitability of a particular solid organic polymeric particulate material or composition(s) may be determined by testing, as illustrated hereinafter, and a composition or compositions may be prepared, for example, by blending, or may be chosen, which degrade or decompose at a rate corresponding to the time required for carrying out the fracturing operation, as determined by such testing. Accordingly, the solid organic polymeric particulate matter employed in the invention may be chosen from a wide variety of organic polymeric materials of the type mentioned, provided the particles possess such delayed reactivity and/or decomposition characteristics. Thus, natural and synthetic organic polymers or elastomers having an average molecular weight of at least 10,000, preferably at least 15,000 to 18,000, and most preferably at least 100,000, as determined by size exclusion chromatography or other suitable method, having the required reactivity and/or decomposition characteristics, may be employed. As utilized herein, the expressions "organic polymeric", as applied to "compound" and to "material", and "organic polymer" and "polymer", are understood to include not only polymerization products of a monomer, but copolymers, terpolymers, etc. Additionally, all types of mixtures of the mentioned materials may be employed. For example, suitable polymeric particulate matter derived from cellulose, acrylic acid, aramides, acrylonitrile, polyamides, vinylidene, olefins, diolefins, polyester, polyurethane, vinyl alcohol, and vinyl chloride, may be used. Preferred compositions, assuming the required reactivity and/or decomposition characteristics may be selected from rayon, acetate, triacetate, cotton, wool (cellulose group); nylon, acrylic, modacrylic, nitrile, polyester, saran, spandex, vinyon, olefin, vinyl, (synthetic polymer group); azlon, rubber (protein and rubber group), and mixtures thereof. Polyester and polyamide particles of sufficient molecular weight, such as from Dacron® and nylon, respectively, and mixtures thereof, are most preferred. Again, composite particles, comprising natural and/or synthetic materials of appropriate characteristics, may be employed. For example, a suitable composite particle might comprise a core and sheath structure where the sheath material and the core material degrade over different desired periods of time. The compounds or compositions employed as organic polymeric material according to the invention need not be pure, and commercially available materials containing various additives, fillers, etc. or having coatings may be used, so long as such components do not interfere with the required activity.

As indicated, the amount of the organic polymeric particulate matter supplied will be sufficient for the task required, i.e., a sufficient or effective amount, an amount sufficient to provide a sufficient concentration of a composition or compositions which are effective to degrade the gelled suspension to the desired degree. Normally, as also indicated, this composition or compositions will comprise one or more of the ultimate reaction or decomposition products of the organic polymeric material. Preferably, the organic polymeric particulate matter level, i.e., concentration, provided initially in the fluid may range from 0.02 percent up to about 10 percent by weight of the fluid. Most preferably, however, the concentration ranges from about 0.02 percent to about 5.0 percent by weight of fluid.

Particle size and shape, while important, may be varied considerably, depending on timing and transport considerations. Preferably, if irregular or spherical particles of the organic polymer are used, particle size may range from 80 mesh to 2.5 mesh (Tyler), preferably from 60 mesh to 3 mesh. Fibers and/or platelets of the specified polymeric materials are preferred for their mobility and transfer aiding capability. In the case of fibers of the organic polymer, the fibers employed according to the invention may also have a wide range of dimensions and properties. As employed herein, the term "fibers" refers to bodies or masses, such as filaments, of natural or synthetic material(s) having one dimension significantly longer than the other two, which are at least similar in size, and further includes mixtures of such materials having multiple sizes and types. Preferably, in accordance with the invention, individual fiber lengths may range upwardly from about 1 millimeter. Practical limitations of handling, mixing, and pumping equipment in wellbore applications, currently limit the practical use length of the fibers to about 100 millimeters. Accordingly, a preferred range of fiber length will be from about 1 mm to about 100 mm or so, with a most preferred length being from at least about 2 mm up to about 30 mm. Similarly, fiber diameters will preferably range upwardly from about 5 microns, a preferred range being from about 5 microns to about 40 microns, most preferably from about 8 microns to about 20 microns, depending on the modulus of the fiber, as described more fully hereinafter. A ratio of length to diameter (assuming the cross section of the fiber to be circular) in excess of 50 is preferred. However, the fibers may have a variety of shapes ranging from simple round or oval cross-sectional areas to more complex shapes such as trilobe, figure eight, star-shape, rectangular cross-sectional, or the like. Preferably, generally straight fibers with round or oval cross sections will be used. Curved, crimped, branched, spiral-shaped, hollow, fibrillated, and other three dimensional fiber geometries may be used. Again, the fibers may be hooked on one or both ends. Fiber and platelet densities are not critical, and will preferably range from below 1 to 4 g/cm$^3$ or more.

Those skilled in the art will recognize that a dividing line between what constitute "platelets", on one hand, and "fibers", on the other, tends to be arbitrary, with platelets being distinguished practically from fibers by having two dimensions of comparable size both of which are significantly larger than the third dimension, fibers, as indicated, generally having one dimension significantly larger than the other two, which are similar in size. As used herein, the terms "platelet" or "platelets" are employed in their ordinary sense, suggesting flatness or extension in two particular dimensions, rather than in one dimension, and also is understood to include mixtures of both differing types and sizes. In general, shavings, discs, wafers, films, and strips of the polymeric material(s) may be used. Conventionally, the term "aspect ratio" is understood to be the ratio of one dimension, especially a dimension of a surface, to another dimension. As used herein, the phrase is taken to indicate the ratio of the diameter of the surface area of the largest side of a segment of material, treating or assuming such segment surface area to be circular, to the thickness of the material (on average). Accordingly, the platelets utilized in the invention will possess an average aspect ratio of from about 10 to about 10,000, preferably 100 to 1000. Preferably, the platelets will be larger than 5 microns in the shortest dimension, the dimensions of a platelet which may be used in the invention being, for example, 6 mm×2 mm×15 µm.

In a particularly advantageous aspect of the invention, particle size of the organic polymeric particulate matter may be managed or adjusted to advance or retard the reaction or degradation of the gelled suspension in the fracture. Thus, for example, of the total particulate matter content, 20 percent may comprise larger particles, e.g., greater than 100 microns, and 80 percent smaller, say 80 percent smaller than 20 micron particles. Such blending in the gelled suspension may provide, because of surface area considerations, a different time of completion of reaction or decomposition of the particulate matter, and hence the time of completion of gel decomposition or breaking, when compared with that provided by a different particle size distribution.

The selection of the fluid or liquid to form the suspension with the solid organic polymeric particulate material and other components, such as gellant and proppant, is largely a matter of choice, within the capability of those skilled in the art, and per se forms no part of the present invention. As such persons will be aware, however, the fluid, particulate material, gel forming material, etc., must be sufficiently compatible to the extent that they do not react with one another at a rate which would deleteriously interfere to any significant extent with the intended functions specified herein. Commonly, the particular fluid chosen will be determined by such considerations as treating temperature, concentration of solid material to be carried, and the desired objective. In general, any suitable fluid or liquid which provides sufficient viscosity, perhaps in conjunction with solid fibrous materials therein, to transport the proppant and other components utilized to the fracturing area or fracture, does not unduly interfere with the effectiveness of the solid particulate matter of the invention, and which results in minimal damage to the pack and to the formation, may be used, it being understood that the term "fluid", includes mixtures of such materials. The fluid will preferably be aqueous, and may comprise a gas, i.e., a foam may be employed. Any common aqueous well treatment fluid may be employed, keeping the requirements previously mentioned in mind. Suitable fluids may also include aqueous solutions of viscoelastic surfactants, i.e., surfactants which are capable of providing viscosity without requiring the addition of polymers. Fluids comprising oil-in-water emulsions may be used, and, in the appropriate instance, hydrocarbon fluids, such as diesel, may be used. Particularly preferred are the type of fracturing fluids described by Nimerick, Crown, McConnell, and Ainley in U.S. Pat. No. 5,259,455, and those disclosed in U.S. Pat. No. 4,686,052. Proportions of the components of the fluid suspension are selected to insure that fluid character, i.e., flowability, and suspension of the organic polymeric particulate material and solid material, e.g., proppant, are maintained during pumping or down well transport, i.e., an amount of the well treatment fluid or liquid is provided or present sufficient to insure fluid flow for the suspensions. Generally, the composite fluids or fluid suspensions of the invention will comprise viscous liquids.

The solid particulate matter, e.g., fibers, or fibers and/or platelet, containing fluid suspensions used in the invention may be prepared in any suitable manner or in any sequence or order. Thus, the suspension may be provided by blending in any order at the surface, and by addition, in suitable proportions, of the components to the fluid or slurry during treatment on the fly. The suspensions may also be blended offsite. In the case of some materials, which are not readily dispersible, the fibers should be "wetted" with a suitable fluid, such as water or a wellbore fluid, before or during mixing with the fracturing fluid, to allow better feeding of the fibers. Good mixing techniques should be employed to avoid "clumping" of the particulate matter.

To the extent other breaker materials are employed, the total amount of the solid particulate matter of the invention may be reduced. It is possible; however, to provide a combination of solid particulate matter in the manner of the invention along with minor amounts, i.e., less than fifty percent, of other breaker materials, such combinations providing significant transport advantages if the solid particulate matter is in the form of fibers or platelets. As will be understood by those skilled in the art, in the case where fibers and/or platelets are employed to form a porous pack upon completion of the fracturing operation or procedure, e.g., as described in the procedures of the aforementioned U.S. Pat. No. 5,439,055; U.S. Pat. No. 5,330,005; and U.S. Pat. No. 5,501,275, the total amount of fibers employed or pumped, assuming the use of suitable fibers as the solid organic polymeric particulate matter, will include that required for gel breaking and that for porous pack formation. As those skilled in the art will recognize, the fibers employed for pack strengthening will be chosen for durability rather than for the characteristics desired in the breaker materials selected herein, so that, in a given fracturing operation, both types of fibers may be utilized, each contributing a designed function and both contributing to or enhancing matter mobility or transport. Concentrations of "pack-forming" fibers and/or platelets in the fracturing fluid suspension for porous pack formation will be those described in the above listed patents, with even quite minor amounts of fibers and/or platelets being effective or sufficient to enhance transport.

Any suitable polymeric gel forming material or gellant, preferably water soluble, used by those skilled in the art to treat subterranean formations and form stable or stabilized gels of the fluid suspension may be employed in the invention. For simplicity hereinafter, included in the phrase "water soluble", as applied to the gellant, are those suitable polymeric materials which are dispersible or suspendable in water or aqueous liquid. Suitable gellants also include cross-linkable polymers or monomers for forming such polymers under the conditions extant. Such cross-linkable polymeric and polymer forming materials are well known, and the cross-linked polymer or polymers which produce the stable or stabilized gel are preferably formed by reacting or contacting appropriate proportions of the cross-linkable polymer with at least one cross-linking agent of this invention. Similarly, procedures for preparing gelable compositions or fluids and conditions under which such compositions form stable gels in subterranean formations are well known to those skilled in the art. As indicated, gel-forming compositions according to the invention may be formed by mixing, in water, the water soluble cross-linkable polymer and the crosslinking agent.

In forming the gel, the cross-linkable polymer(s) and at least one cross-linking agent of this invention and concentrations thereof are normally selected to assure (a) gel formation or presence at subterranean (i.e., formation or reservoir) conditions and (b) suitable time allotment for injection of the composition prior to the completion of gelation, or sufficient fluidity of the gelled composition to allow pumping down well. The polymer (or monomers used to form the polymer) and the at least one cross-linking agent of this invention are generally selected and supplied in amounts effective to achieve these objectives. By "effective" amounts of the polymer or polymers (or monomers) and at least one cross-linking agent of this invention is meant amounts sufficient to provide cross-linked polymers and form the desired stable gel under the conditions extant. Generally, a water soluble cross-linkable polymer concentration in the aqueous liquid of from about 0.05 to about 40 percent, preferably from about 0.1 percent to about 10 percent, and, most preferably, from about 0.2 percent to about 7 percent, may be employed (or sufficient monomer(s) to form these amounts of polymer). Typically, the at least one cross-linking agent of this invention is employed in the aqueous liquid in a concentration of from about 0.001 percent to about 2 percent, preferably from about 0.005 percent to about 1.5 percent, and, most preferably, from about 0.01 percent to about 1.0 percent.

However, if a cross-linked polymer is to be used, the fluids of the invention need not contain both the cross-linkable polymer and the at least one cross-linking agent of this invention at the surface. The cross-linkable polymer or the at least one cross-linking agent of this invention may be omitted from the fluid sent downhole, the omitted material being introduced into the subterranean formation as a separate slug, either before, after, or simultaneously with the introduction of the fluid. In such cases, concentrations of the slugs will be adjusted to insure the required ratios of the components for proper gel formation at the desired location. Preferably, the surface formulated composition or fluid comprises at least the cross-linkable polymeric material (e.g., acrylamide, vinyl acetate, acrylic acid, vinyl alcohol, methacrylamide, ethylene oxide, or propylene oxide). More preferably, the composition comprises both (a) the crosslinking agent and (b) either (i) the crosslinkable polymer or (ii) the polymerizable monomers capable of forming a crosslinkable polymer. In treating a subterranean fracture, the formulations may be allowed to gel or begin gelation before entering the formation.

As indicated, mixtures of polymeric gel forming material or gellants may be used. Materials which may be used include water soluble cross-linkable polymers, copolymers, and terpolymers, such as polyvinyl polymers, polyacrylamides, cellulose ethers, polysaccharides, lignosulfonates, ammonium salts thereof, alkali metal salts thereof, alkaline earth salts of lignosulfonates, and mixtures thereof. Specific polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), ammonium and alkali metal salts thereof, and mixtures thereof. Preferred water soluble crosslinkable polymers include hydroxypropyl guar, carboxymethylhydroxypropyl guar, partially hydrolyzed polyacrylamides, xanthan gum, polyvinyl alcohol, the ammonium and alkali metal salts thereof, and mixtures thereof.

Similarly, the crosslinking agent(s) may be selected from those organic and inorganic compounds well known to those skilled in the art useful for such purpose, and the phrase "crosslinking agent", as used herein, includes mixtures of such compounds. Exemplary organic crosslinking agents include, but are not limited to, aldehydes, dialdehydes, phenols, substituted phenols, ethers, and mixtures thereof. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloracetate, hydroxyphenylalkanols, formaldehyde, paraformaldehyde, acetaldehyde, propanaldehyde, butyraldehyde, isobutyraldehyde, valeraldehyde, heptaldehyde, decanal, glyoxal, glutaraldehyde, terephthaldehyde, hexamethyl-enetetramine, trioxane, tetraoxane, polyoxymethylene, and divinylether may be used. Typical inorganic crosslinking agents which can be used in conjunction with at least one cross-linking agent of this invention are polyvalent metals, chelated polyvalent metals, and compounds capable of yielding polyvalent metals, including organometallic compounds as well as borates and boron complexes, and mixtures thereof. Preferred inorganic crosslinking agents include chromium salts, complexes, or chelates, such as chromium nitrate, chromium citrate, chromium acetate, chromium propionate, chromium malonate, chromium lactate, etc.; aluminum salts, such as aluminum citrate, aluminates, and aluminum complexes and chelates; titanium salts, complexes, and chelates; zirconium salts, complexes or chelates, such as zirconium lactate; and boron containing compounds such as boric acid, borates, and boron complexes. Fluids containing additives such as those described in U.S. Pat. No. 4,683,068 and U.S. Pat. No. 5,082,579 may be used.

As mentioned, the pre-gel fluid suspension formed in the invention may be foamed, normally by use of a suitable gas. Foaming procedures are well known, and per se form no part of the invention. In such instances, the fluids of the invention will preferably include a surfactant or surfactants. Preferred surfactants are water-soluble or dispersible and have sufficient foaming ability to enable the composition, when traversed or agitated by a gas, to foam. The selection of a suitable surface active agent or agents, is within the ability of those skilled in the art. Preferred surfactants are those which, when incorporated into water in a concentration of about 5 weight percent or less (based on the total weight of water and surfactant), meet the test described in the aforementioned U.S. Pat. No. 5,246,073.

Similarly, the precise nature of the proppant employed is not critical, the proppant being selected for the desired purpose, i.e., "propping" open a fracture, and those skilled in the art may readily select an appropriate wellbore particulate solid or solids for the desired purpose. The term "proppant" is understood to include mixtures, and may include, for example, a mixture of different sized proppants, or a gravel. Resin coated sand or ceramic proppant may be used. Particles or beads of silica, sintered materials or minerals, such as sintered bauxite, alumina, or corundum, may be used. Generally, the proppant will be added or present in the fluid in a concentration of from 0.5 or 1 lb./gallon to about 25 lbs/gallon, preferably from 1 lb./gallon to about 20 lbs/gallon. Normally, the proppant will have an average particle size less than about 8 mesh and greater than 60 or 80 mesh (U.S.). Sized mixtures of particles may be used, such as the common larger sized natural and synthetic inorganic proppant mixtures. Sized sand and synthetic inorganic proppants such as 20/40 sized sand, 16/20 sized sand, 12/20 sized sand, 8/12 sized sand, and similarly sized ceramic proppants, such as "CARBOLITE™" proppants, may be used.

The novel blend of aqueous suspending fluid, proppant, gellant, at least one cross-linking agent of this invention, and organic polymeric particulate matter may be prepared, as indicated, in any suitable manner, the components being blended in any suitable sequence. Normally, however, the preferred job execution practice is to mix the entire batch to be pumped during the job. In some instances, it may be preferred to pump the suspension of the invention only during a portion of the job, e.g., as the last 10-25% of the proppant into the fracture as a "tail-in", to control flow back in the most economical manner or for other reasons. A slug may also be pumped at other stages. As mentioned, the invention has particular advantage in treatment of subterranean formations having a temperature above about 225° F.

In one procedural aspect of the invention, the fluid suspension is pumped down well, normally gelled, through the wellbore under fracturing pressure to the subterranean formation, and the subterranean formation may be fractured or the fracture may be extended. Gelling may be initiated or enhanced, for example, by temperature or by pH control, in a manner known to those skilled in the art. The gelled suspension is deposited in the formation, and after a suitable interval, such as after the fracturing operation is completed, the decomposition or reaction of the particulate matter in the downwell environment becomes significant. If necessary, the interval may be extended as appropriate to allow the gelled suspension to "break" or degrade. As used herein, the term "downwell environment" simply refers to the circumstances acting on the organic polymeric particulate matter downwell, including, but not limited to, the temperature of the subterranean formation, the composition of the formation, and any component or components of the suspension. Upon degradation of the gel by the action of the decomposition or reaction products, the fluids resulting from the breaking of the gel, minus leak-off, are then returned or allowed to return from the deposit locus to the wellbore, the decomposition or reaction of the solid particulate matter in effect "removing" organic polymeric particulate matter from the deposit. If additional particulate matter, such as durable fibers and/or platelets, or other materials are in the suspension deposited in the fracture, a matrix or pack of such and proppant (with a minor residuum of well treating fluid) is left in the fracture.

EXPERIMENTS OF THE INVENTION

The experimental data given below are based on fracturing fluids including a cross-linking agent of this invention. Seven different cross-linking agents were studies studied. Each is a reaction product of a borate or borate generating reagent and a zirconium alkoxide. The seven agents were given the following sample identifications: TLF-10086, TLF-10101, TLF-10102, TLF-10103, TLF-10104, TLF-10105 and, TLF-10106. Tables IA&B tabulate the samples, their B:Zr molecular ratio, their wt. % Zr and their wt. % B.

TABLE IA

Zirconium/Boron Cross-linking Agent Compositions

| Sample ID | Molar Ratio | Wt. % Zr | Wt. % B |
|---|---|---|---|
| TLF-10086 | 1:1 | 3.8 | 0.45 |
| TLF-10101 | 4:1 | 3.2 | 1.5 |
| TLF-10102 | 2:1 | 3.8 | 0.9 |
| TLF-10103 | 2:1 | 3.8 | 0.9 |
| TLF-10104 | 4:1 | 3.8 | 1.8 |
| TLF-10105 | 4:1 | 3.2 | 1.5 |
| TLF-10106 | 2:1 | 3.8 | 0.9 |

| CODE | VENDER | % (w/w) | % (w/w) | SP. GR. | LB/GAL |
|---|---|---|---|---|---|
| WXL-100L | MAGNABLEND | 1.56 | 5 | 1.18 | 9.84 |
| WXL-105L | MAGNABLEND | 0.48 | 1.55 | 1.13 | 9.42 |
| WXL-101L | TBC BRINADD | 6.09 | 19.59 | 1.13 | 9.67 |
| WXL-101LE | TBC BRINADD | 4.45-4.86 | 14.98 | 1.41 | 11.76 |
| TBD | TBC BRINADD | 5.52-5.88 | 18.33 | 1.19 | 9.94 |

*DATA ARE BASED ON AVERAGES FROM RANGES REPORTED BY THE VENDCER.
TBC-X94 (Fracsal II in Enhanced Mineral Oil) Calculated Density = 9.94 ppg Calculated % Boron by weight = 5.52-5.88
WXL-101LE Calculated Density = 11.76 ppg Calculated % Boron by weight = 4.45-4.86

The experimental examples described herein are designed to determine surface cross-linking characteristics and high temperature rheological properties of CMHPG gel system with different "one component" boron-zirconium solutions having: (1) a boron to zirconium 1:1 molar mixture of a boric acid complex (chelates of boro triethanolamine) and zirconium n-propoxide (NPZ) containing 3.8% Zr and 0.45% B by weight; (2) 0.5:1 molar mixture of a boric acid complex (chelates of boro triethanolamine) and NPZ containing 3.8% Zr and 0.223% B by weight; and (3) 4:1 molar mixture of a boric acid complex and NPZ containing 3.8% Zr and 1.5% B by weight.

One key difference between the cross-linking systems of this invention and the fracturing fluid derived therefrom and prior art cross-linking systems such as the system disclosed in U.S. Pat. No. 5,217,632 is that in the cross-linking system of this invention is a borozirconate reaction product of a borate compound and a zirconium alkoxide, while in the cross-linking system of U.S. Pat. No. 5,217,632 uses a source of zirconium carboxylate salt such as zirconium lactate, zirconium citrate and zirconium tartrate mixed with a borate compound. The reaction product derived from zirconium alkoxide and borate yield better cross-linking density, uniformity and high temperature stability.

One key difference between the cross-linking systems of this invention, which comprises a borozirconate reaction product of a borate compound and a zirconium alkoxide, and U.S. Pat. No. 6,214,773, which comprises a mixture of water, triethanolamine, a polyhydroxyl containing compound and isopropyl alcohol, an organotitanate chelate or an organozirconate chelate and a borate ion producing compound, is that the cross-linking system of this invention is a single component reaction product. These reaction products give rise to improved high temperature stability, improved cross-link uniformity and a good delayed cross-linking.

Moreover, there is a persistent and long standing customer request for an improved delayed zirconium/boron cross-linking systems for us with MagnumFrac high pH. The customers also are requesting an easier and more reproducible cross-linker, which include the formation of stable zirconate cross-links downhole, and rapid borate cross-link at surface. This is especially desired by certain "high end" fracturing fluids used in deep, hot well environments. The cross-linking systems of this invention are capable of satisfying these long felt and unsatisfied needs.

A single component cross-linking system of this invention permits superior quality control on site, instead of having to mix a two component system on site. The cross-linkers of this invention should also yield cost savings along with higher quality since no material is wasted due to mixing of chemicals on site.

Tabulated in Table II are a series of fracturing fluid runs using the cross-linking systems of this invention as set forth in Table I.

TABLE II

Fracturing Fluid Tests Using the Cross-linkers of Table I

| Test | Composition ID | | Frac Fluid | Cross-linker Concentration |
|---|---|---|---|---|
| 1 | TLF-10086 | TEST 3545 | 40 # in KCl sub | 1.4 GAL/MGAL |
| 2 | TLF-10086 | TEST 3534 | 40 # in KCl sub | 1.6 GAL/MGAL |
| 3 | TLF-10086 | TEST 3546 | 40 # in KCl sub | 1.8 GAL/MGAL |
| 4 | TLF-10101 | TEST-3539 | 40 # in KCl sub | 1.4 GAL/MGAL |
| 5 | TLF-10101 | TEST-3578 | 40 # in KCl sub | 1.6 GAL/MGAL |
| 6 | TLF-10101 | TEST-3547 | 40 # in KCl sub | 1.8 GAL/MGAL |
| 7 | TLF-10101 | TEST-3533 | 40 # in KCl sub | 1.6 GAL/MGAL |
| 8 | TLF-10101 | TEST-3528 | 40 # in KCl sub | 1.6 GAL/MGAL |
| 9 | TLF-10102 | TEST-3540 | 40 # in KCl sub | 1.4 GAL/MGAL |
| 10 | TLF-10102 | TEST-3527 | 40 # in KCl sub | 1.6 GAL/MGAL |
| 11 | TLF-10102 | TEST-3548 | 40 # in KCl sub | 1.8 GAL/MGAL |
| 12 | TLF-10102 | TEST-4134 | 40 # in 2% KCl | 0.8 GAL/MGAL |
| 13 | TLF-10102 | TEST-4131 | 40 # in 2% KCl | 0.8 GAL/MGAL |
| 14 | TLF-10102 | TEST-4153 | 50 # in 2% KCl | 1.0 GAL/MGAL |
| 15 | TLF-10102 | TEST-4113 | 50 # in KCl sub | 1.6 GAL/MGAL |
| 16 | TLF-10102 | TEST-4112 | 40 # in KCl sub | 1.6 GAL/MGAL |
| 17 | TLF-10103 | TEST-3541 | 40 # in KCl sub | 1.4 GAL/MGAL |
| 18 | TLF-10103 | TEST-3529 | 40 # in KCl sub | 1.6 GAL/MGAL |
| 19 | TLF-10103 | TEST-3554 | 40 # in KCl sub | 1.8 GAL/MGAL |
| 20 | TLF-10103 | TEST-4138 | 40 # in 2% KCl | 0.8 GAL/MGAL |
| 21 | TLF-10103 | TEST-4162 | 50 # in KCl sub | 1.0 GAL/MGAL |
| 22 | TLF-10103 | TEST-4116 | 40 # in KCl sub | 1.6 GAL/MGAL |
| 23 | TLF-10103 | TEST-3549 | 40 # in KCl sub | 1.8 GAL/MGAL |
| 24 | TLF-10104 | TEST-3542 | 40 # in KCl sub | 1.4 GAL/MGAL |
| 25 | TLF-10104 | TEST-3530 | 40 # in KCl sub | 1.6 GAL/MGAL |
| 26 | TLF-10104 | TEST-3550 | 40 # in KCl sub | 1.8 GAL/MGAL |
| 27 | TLF-10105 | TEST-3543 | 40 # in KCl sub | 1.4 GAL/MGAL |
| 28 | TLF-10105 | TEST-3531 | 40 # in KCl sub | 1.6 GAL/MGAL |
| 29 | TLF-10105 | TEST-3551 | 40 # in KCl sub | 1.8 GAL/MGAL |
| 30 | TLF-10106 | TEST-3544 | 40 # in KCl sub | 1.4 GAL/MGAL |
| 31 | TLF-10106 | TEST-3532 | 40 # in KCl sub | 1.6 GAL/MGAL |
| 32 | TLF-10106 | TEST-3553 | 40 # in KCl sub | 1.8 GAL/MGAL |
| 33 | TLF-10106 | TEST-4145 | 40 # in 2% KCl | 0.8 GAL/MGAL |
| 34 | TLF-10106 | TEST-4126 | 40 # in 2% KCl | 1.6 GAL/MGAL |
| 35 | TLF-10106 | TEST-4123 | 40 # in 2% KCl | 1.6 GAL/MGAL |

The test conditions and fracturing fluid compositions for the tests of Table II as given below.

TABLE IIIa

Test 01 - 1.4 GAL/MGAL TLF-10086 in 40 # KCl sub Test Conditions M5500Frac Test Report

| | |
|---|---|
| Test Name: | TEST-3545 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.21 |
| Post-Test pH: | 10.21 |

TABLE IIIb

Test 01 - 1.4 GAL/MGAL TLF-10086 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10086 | 1.4 GAL/MGAL |
| WGS-160L | 4.5 GAL/MGAL | | |

TABLE IVa

Test 02 - 1.6 GAL/MGAL TLF-10086 40 # KCl sub Test Conditions M5500Frac Test Report

| | |
|---|---|
| Test Name: | TEST-3534 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.27 |
| Post-Test pH: | 10.27 |

TABLE IVb

Test 02 - 1.6 GAL/MGAL TLF-10086 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10086 | 1.6 GAL/MGAL |
| WGS-160L | 4.5 GAL/MGAL | | |

TABLE Va

Test 03 - 1.8 GAL/MGAL TLF-10086 40 # KCl sub Test Conditions M5500Frac Test Report

| | |
|---|---|
| Test Name: | TEST-3546 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.21 |
| Post-Test pH: | 10.21 |

TABLE Vb

Test 03 - 1.8 GAL/MGAL TLF-10086 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10086 | 1.8 GAL/MGAL |
| WGS-160L | 4.5 GAL/MGAL | | |

Figure 1B:
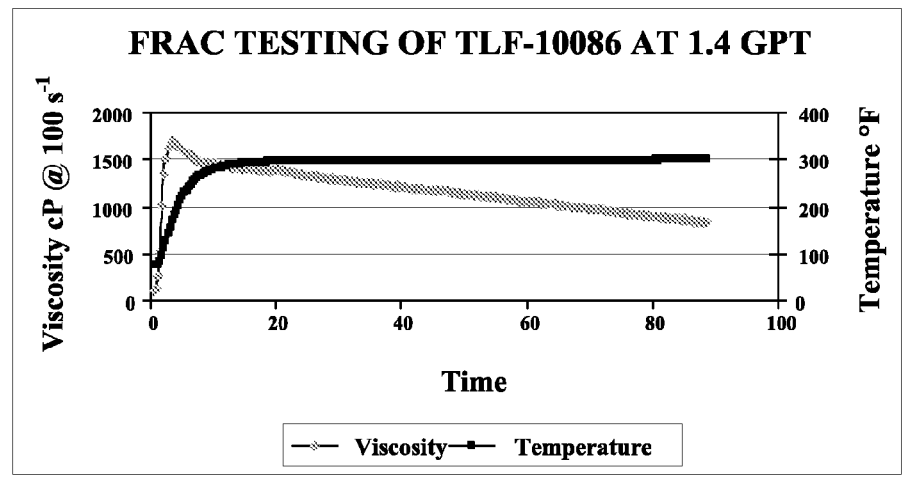
FIG. 1B depict a graph of Frac testing of TLF-10086 at 1.4 Gal/MGal (gallons per thousand gallons).
Figure 1C:
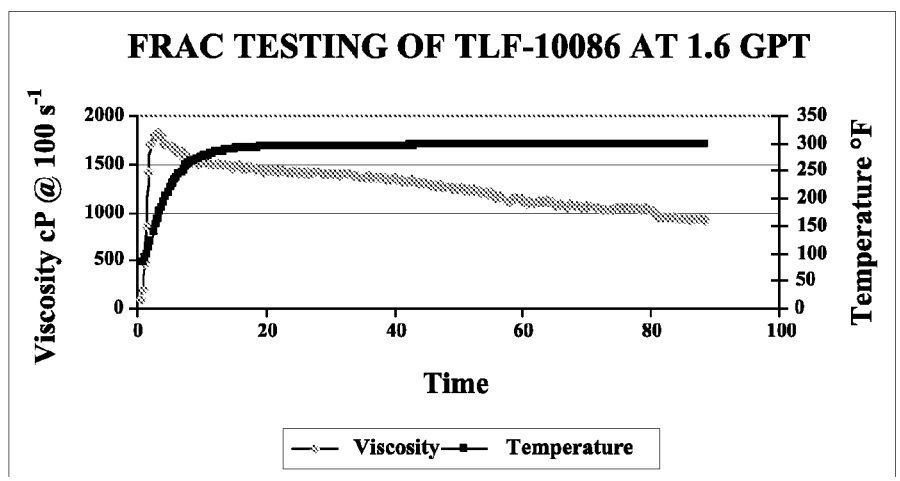
FIG. 1C depict a graph of Frac testing of TLF-10086 at. 1.6 Gal/MGal.
Figure 1D:
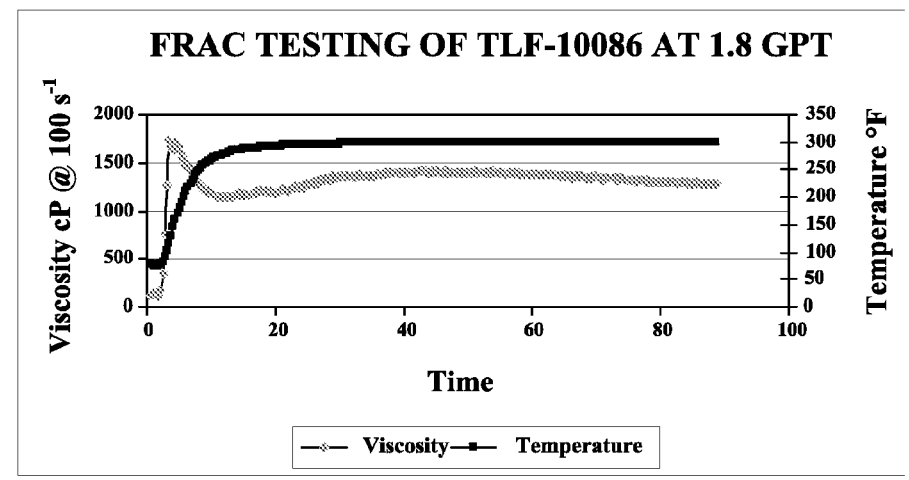
FIG. 1D depict a graph of Frac testing of TLF-10086 at 1.8 Gal/MGal.

Referring now to FIG. 1A, viscosity plots of test results of TLF-10086 cross-linking composition in Tests 01-03 are shown. Referring to FIGS. 1B-D, viscosity and temperatures plots are shown for Tests 01-03.

TABLE VIa

Test 04 - 1.4 GAL/MGAL TLF-10101 40 # KCl sub Test Conditions M5500Frac Test Report

| | |
|---|---|
| Test Name: | TEST-3539 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.21 |
| Post-Test pH: | 10.21 |

TABLE VIb

Test 04 - 1.4 GAL/MGAL TLF-10101 in 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10101 | 1.4 GAL/MGAL |
| WGS-160L | 4.5 GAL/MGAL | | |

TABLE VIIa

Test 05 - 1.6 GAL/MGAL TLF-10101 40 # KCl sub Test Conditions M5500Frac Test Report

| | |
|---|---|
| Test Name: | TEST-3578 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.25 |
| Post-Test pH: | 10.25 |

TABLE VIIb

Test 05 - 1.6 GAL/MGAL TLF-10101 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10101 | 1.6 GAL/MGAL |
| WGS-160L | 4.5 GAL/MGAL | | |

TABLE VIIIa

Test 06 - 1.8 GAL/MGAL TLF-10101 40 # KCl sub Test Conditions
M5500Frac Test Report

| | |
|---|---|
| Test Name: | TEST-3547 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.28 |
| Post-Test pH: | 10.28 |

TABLE VIIIb

Test 06 - 1.8 GAL/MGAL TLF-10101 40 # KCl sub Composition

| Additives | Concentration | Additives | Concentration |
|---|---|---|---|
| SA WATER | 1000 GAL/MGAL | WNE-342L | 1 GAL/MGAL |
| BIO CLEAR 200 | 0.05 GAL/MGAL | WGS-160L | 4.5 GAL/MGAL |
| WPA-556L | 1 GAL/MGAL | WXL-117L | 0.3 GAL/MGAL |
| WGA-5L | 10 GAL/MGAL | TLF-10101 | 1.8 GAL/MGAL |
| WCS-631L | 2 GAL/MGAL | | |

Figure 2A:
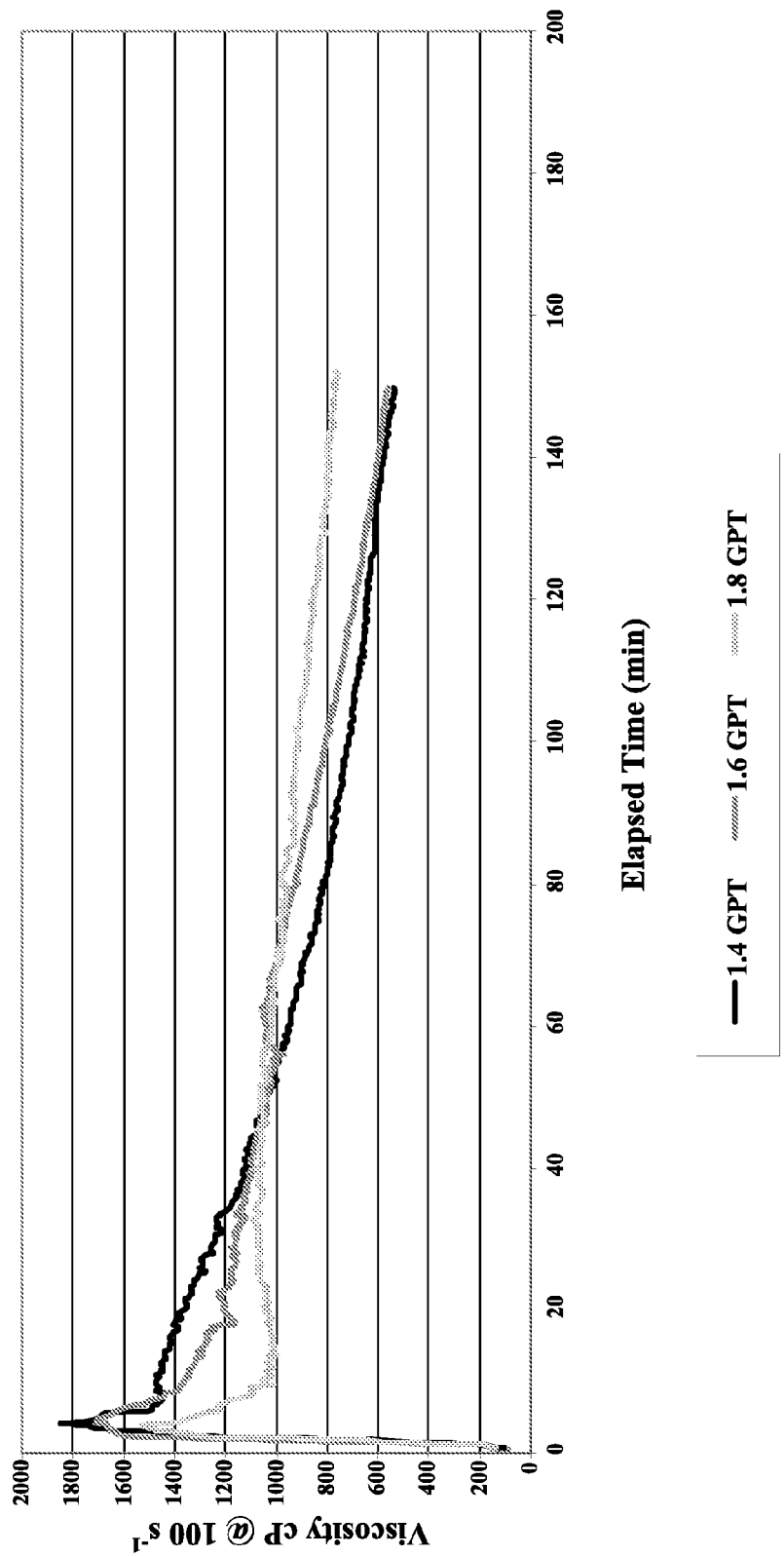
FIG. 2A depict a graph of 300° F. viscosity testing of TLF-1101 at varying loadings.
Figure 2B:
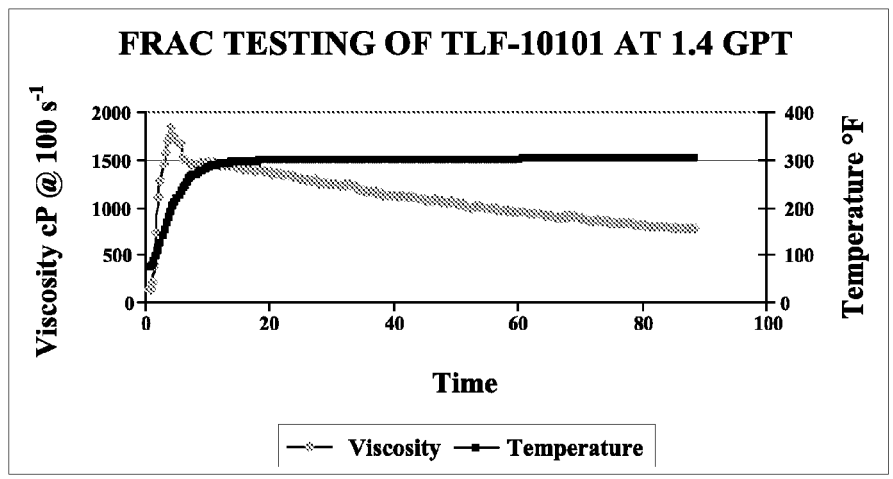
FIG. 2B depict a graph of Frac testing of TLF-1101 at 1.4 Gal/MGal.
Figure 2C:
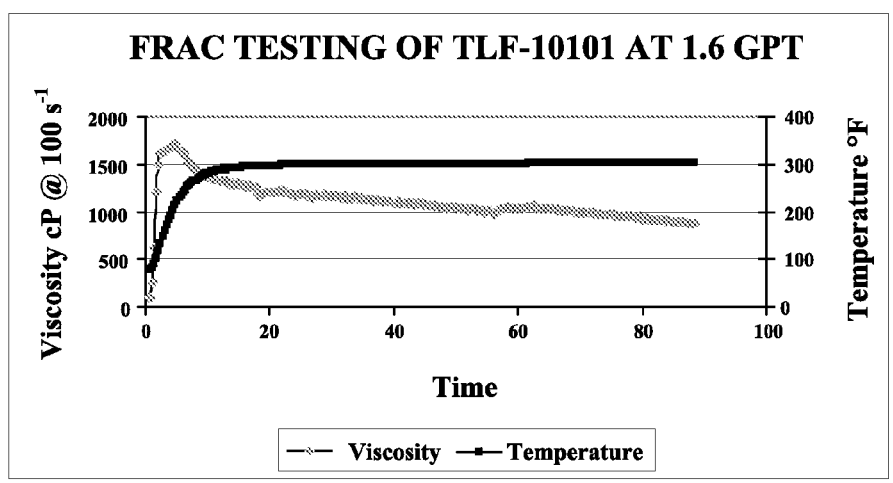
FIG. 2C depict a graph of Frac testing of TLF-1101 at 1.6 Gal/MGal.
Figure 2D:
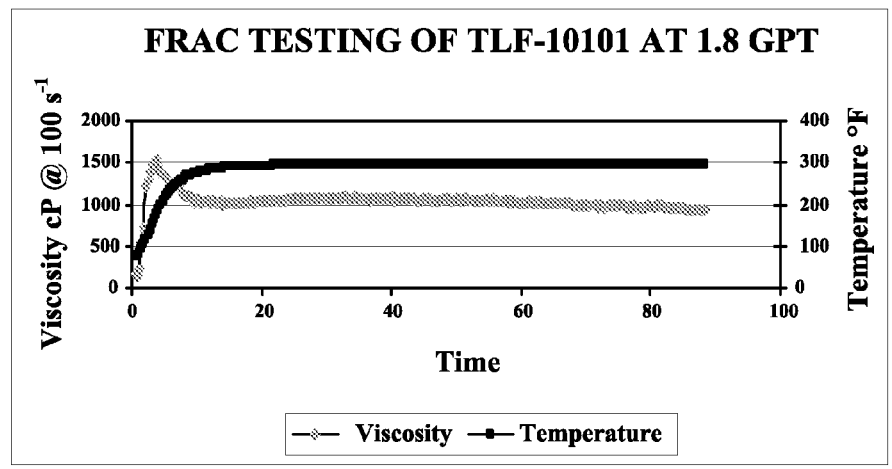
FIG. 2D depict a graph of Frac testing of TLF-10101 at 1.8 Gal/MGal.

Referring now to FIG. 2A, viscosity plots of test results of TLF-10101 cross-linking composition in Tests 04-06 are shown. Referring to FIGS. 2B-D, viscosity and temperatures plots are shown for Tests 04-06.

TABLE IXa

Test 07 - 1.6 GAL/MGAL TLF-10101 40 # KCl sub Test Conditions
M5500Frac Test Report

| | |
|---|---|
| Test Name: | TEST-3533 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.3 |
| Post-Test pH: | 10.31 |

TABLE IXb

Test 07 - 1.6 GAL/MGAL TLF-10101 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10101 | 1.6 GAL/MGAL |
| WGS-160L | 4.5 GAL/MGAL | | |

TABLE Xa

Test 08 - 1.6 GAL/MGAL TLF-10101 40 # KCl sub Test Conditions
M5500Frac Test Report

| | |
|---|---|
| Test Name: | TEST-3528 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.25 |
| Post-Test pH: | 10.25 |

TABLE Xb

Test 08 - 1.6 GAL/MGAL TLF-10101 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10101 | 1.6 GAL/MGAL |
| WGS-160L | 4.5 GAL/MGAL | | |

Figure 2E:
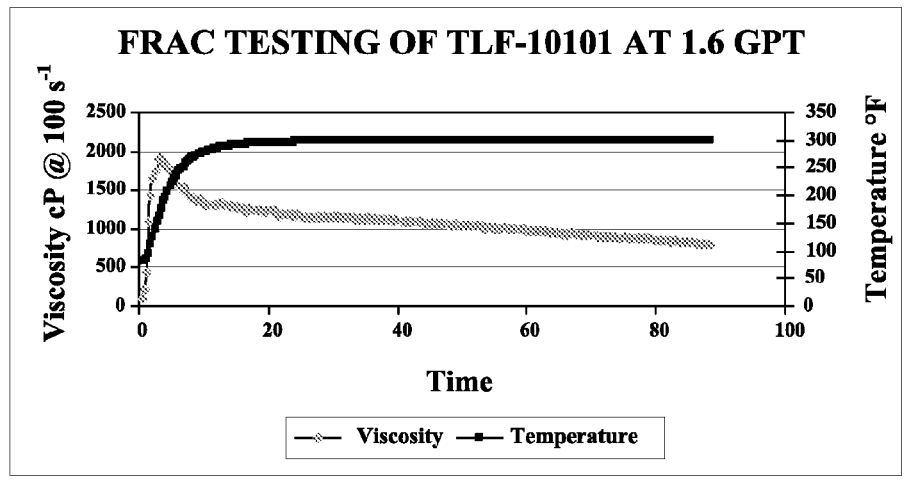
FIG. 2E depict a graph of Frac testing of TLF-10101 at 1.6 Gal/MGal.
Figure 2F:
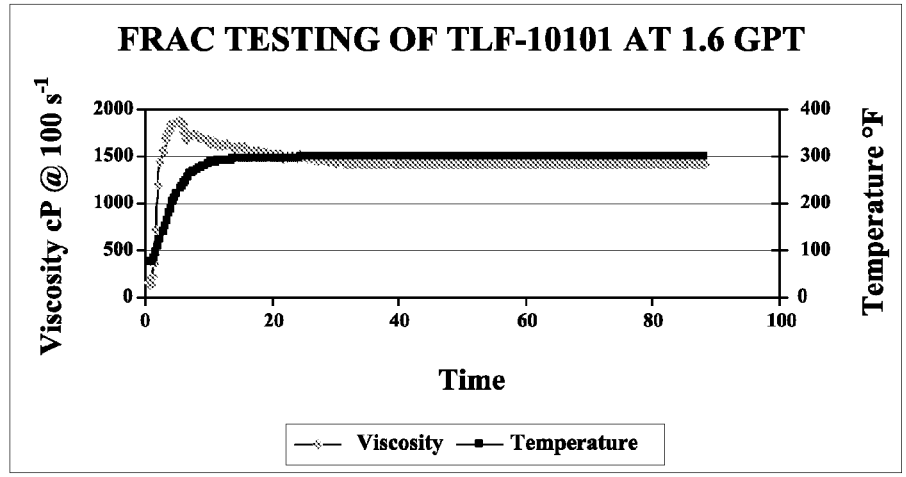
FIG. 2F depict a graph of Frac testing of TLF-10101 at 1.6 Gal/MGal.

Referring now to FIGS. 2E-F, viscosity and temperatures plots for two TLF-10101 containing frac fluids are shown for Tests 07-08.

TABLE XIa

Test 09 - 1.4 GAL/MGAL TLF-10102 40 # KCl sub Test Conditions
M5500Frac Test Report

| | |
|---|---|
| Test Name: | TEST-3540 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.22 |
| Post-Test pH: | 10.22 |

TABLE XIb

Test 09 - 1.4 GAL/MGAL TLF-10102 - 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10102 | 1.4 GAL/MGAL |
| WGS-160L | 4.5 GAL/MGAL | | |

TABLE XIIa

Test 10 - 1.6 GAL/MGAL TLF-10102 - 40 # KCl sub Test Conditions
M5500Frac Test Report

| | |
|---|---|
| Test Name: | TEST-3527 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.25 |
| Post-Test pH: | 10.25 |

TABLE XIIb

Test 10 - 1.6 GAL/MGAL TLF-10102 - 40 # KCl sub Composition

| Additives | Concentration | Additives | Concentration |
|---|---|---|---|
| SA WATER | 1000 GAL/MGAL | WNE-342L | 1 GAL/MGAL |
| BIO CLEAR 200 | 0.05 GAL/MGAL | WGS-160L | 4.5 GAL/MGAL |
| WPA-556L | 1 GAL/MGAL | WXL-117L | 0.3 GAL/MGAL |
| WGA-5L | 10 GAL/MGAL | TLF-10102 | 1.6 GAL/MGAL |
| WCS-631L | 2 GAL/MGAL | | |

TABLE XIIIa

Test 11 - 1.8 GAL/MGAL TLF-10102 - 40 # KCl sub Test Conditions
M5500Frac Test Report

| | |
|---|---|
| Test Name: | TEST-3548 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10 |
| Post-Test pH: | 10 |

TABLE XIIIb

Test 11 - 1.8 GAL/MGAL TLF-10102 - 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10102 | 1.8 GAL/MGAL |
| WGS-160L | 4.5 GAL/MGAL | | |

Figure 3A:
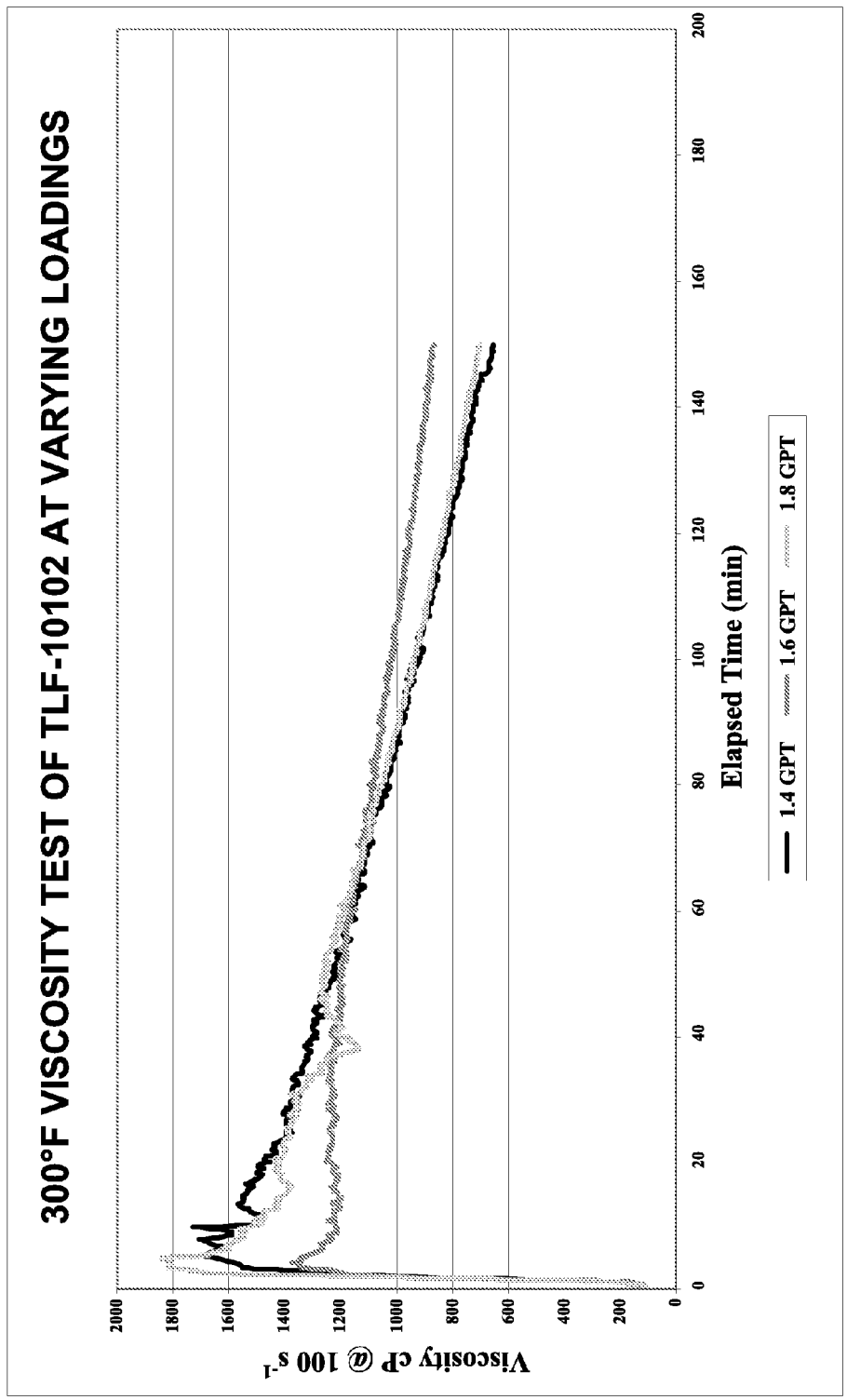
FIG. 3A depict a graph of 300° F. viscosity testing of TLF-10102 at varying loadings.
Figure 3B:
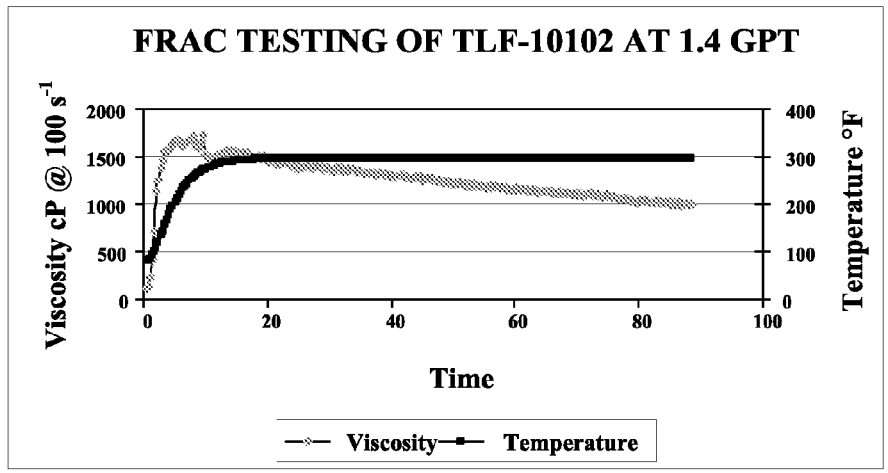
FIG. 3B depict a graph of Frac testing of TLF-10102 at 1.4 Gal/MGal.
Figure 3C:
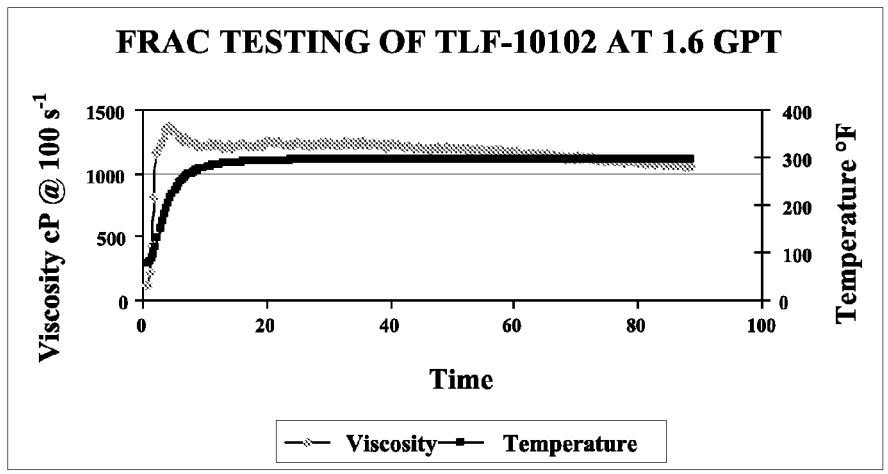
FIG. 3C depict a graph of Frac testing of TLF-10102 at 1.6 Gal/MGal.
Figure 3D:
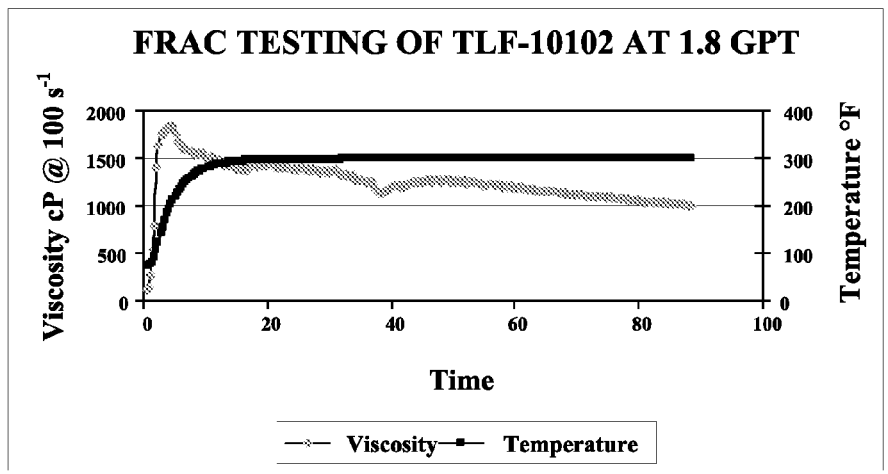
FIG. 3D depict a graph of Frac testing of TLF-10102 at 1.8 Gal/MGal.
Figure 3E:
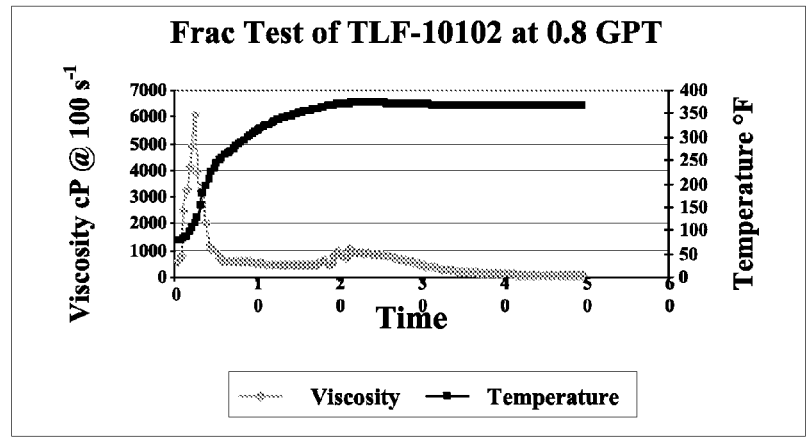
FIG. 3E depict a graph of Frac testing of TLF-10102 at 0.8 Gal/MGal.
Figure 3F:
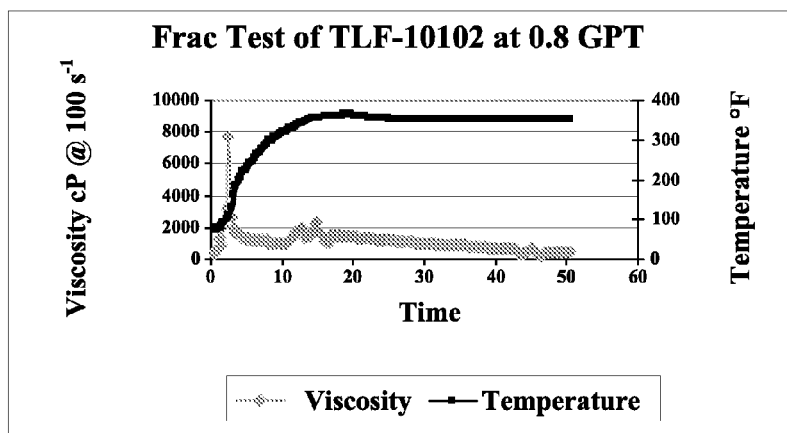
FIG. 3F depict a graph of Frac testing of TLF-10102 at 0.8 Gal/MGal.
Figure 3G:
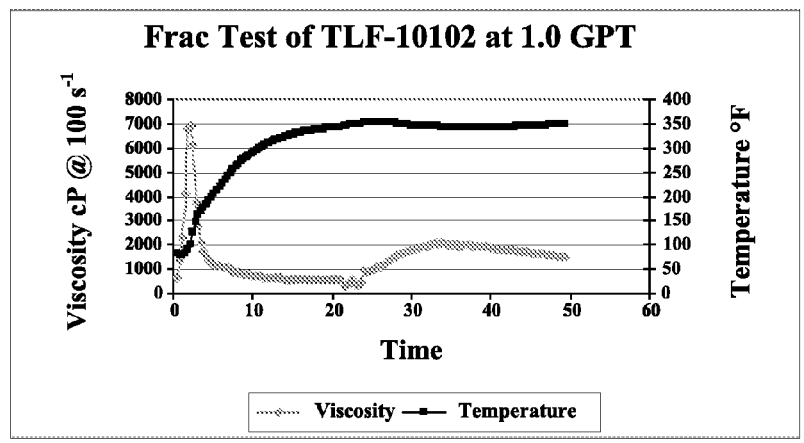
FIG. 3G depict a graph of Frac testing of TLF-10102 at 1.0 Gal/MGal.
Figure 3H:
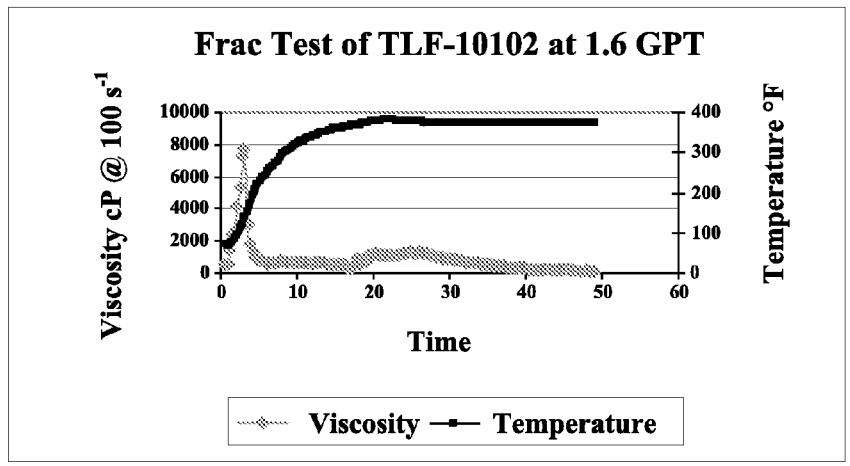
FIG. 3H depict a graph of Frac testing of TLF-10102 at 1.6 Gal/MGal.
Figure 3I:
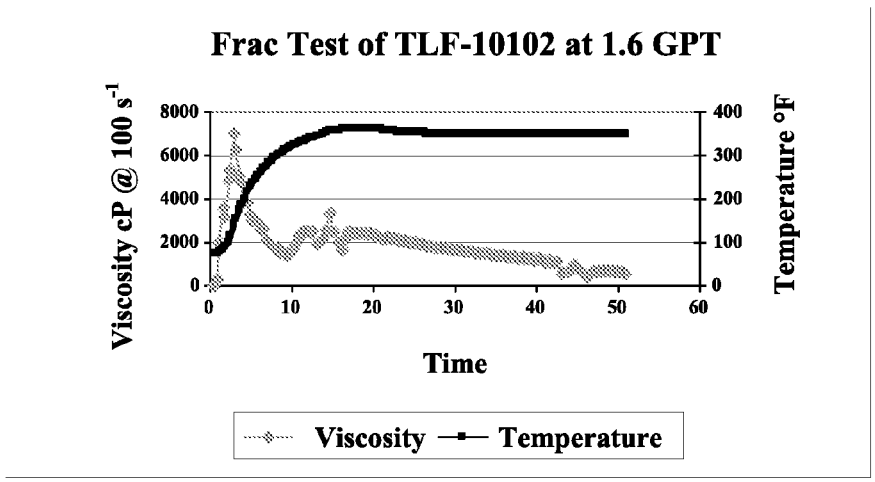
FIG. 3I depict a graph of Frac testing of TLF-10102 at 1.6 Gal/MGal.

Referring now to FIG. 3A, viscosity plots of test results of TLF-10102 cross-linking composition in Tests 09-11 are shown. Referring to FIGS. 3B-D, viscosity and temperatures plots are shown for Tests 09-11.

TABLE XIVa

Test 12 - 0.8 GAL/MGAL TLF-10102 - 375° F. - 40 # 2% KCl Test Conditions
M5500Frac Test Report

| | |
|---|---|
| Test Name: | TEST-4134 |
| Fluid ID: | 40 # 2% KCl |
| Rotor Number: | R1 |
| Bob Number: | B2 |
| Bob Radius (cm) | 1.2276 |
| Bob Eff. Length (cm): | 7.62 |
| Pre-Test pH: | 7.28 |
| Post-Test pH: | 10.28 |

TABLE XIVb

Test 12 - 0.8 GAL/MGAL TLF-10102 - 375° F. - 40 # 2% KCl Composition

| Additives | Concentration | Additives | Concentration |
|---|---|---|---|
| SAT WATER | 1000 GAL/MGAL | WGS-160L | 4.5 GAL/MGAL |
| BIOCLEAR 200 | 0.05 GAL/MGAL | WPB-585L | 1.5 GAL/MGAL |
| WCS-610 | 167 PPT | WXL-117L | 0.3 GAL/MGAL |
| WGA-5L | 10 GAL/MGAL | TLF-10102 | 0.8 GAL/MGAL |
| WNE-342LN | 1 GAL/MGAL | | |

TABLE XVa

Test 13 - 0.8 GAL/MGAL TLF-10102 - 350° F. - 40 # 2% KCl Test Conditions
M5500Frac Test Report

| | |
|---|---|
| Test Name: | TEST-4131 |
| Fluid ID: | 40 # 2% KCl |
| Rotor Number: | R1 |
| Bob Number: | B2 |
| Bob Radius (cm) | 1.2276 |

TABLE XVa-continued

Test 13 - 0.8 GAL/MGAL TLF-10102 - 350° F. - 40 # 2% KCl Test Conditions
M5500Frac Test Report

| | |
|---|---|
| Bob Eff. Length (cm): | 7.62 |
| Pre-Test pH: | 7.38 |
| Post-Test pH: | 10.28 |

TABLE XVb

Test 13 - 0.8 GAL/MGAL TLF-10102 - 350° F. - 40 # 2% KCl Composition

| Additives | Concentration | Additives | Concentration |
|---|---|---|---|
| SAT WATER | 1000 GAL/MGAL | WNE-342L | 1 GAL/MGAL |
| BIOCLEAR 200 | 0.05 GAL/MGAL | WGS-160L | 4.5 GAL/MGAL |
| WPA-556L | 0.5 GAL/MGAL | WPB-585L | 1.5 GAL/MGAL |
| WCS-610 | 167 PPT | WXL-117L | 0.3 GAL/MGAL |
| WGA-5L | 10 GAL/MGAL | TLF-10102 | 0.8 GAL/MGAL |

TABLE XVIa

Test 14 - 1.0 GAL/MGAL TLF-10102 - 350° F. - 50 # 2% KCl Test Conditions
M5500Frac Test Report

| | |
|---|---|
| Test Name: | TEST-4153 |
| Fluid ID: | 50 # 2% KCl |
| Rotor Number: | R1 |
| Bob Number: | B2 |
| Bob Radius (cm) | 1.2276 |
| Bob Eff. Length (cm): | 7.62 |
| Pre-Test pH: | 7.44 |
| Post-Test pH: | 10.26 |

TABLE XVIb

Test 14 - 1.0 GAL/MGAL TLF-10102 - 350° F. - 50 # 2% KCl Composition

| Additives | Concentration | Additives | Concentration |
|---|---|---|---|
| SAT WATER | 1000 GAL/MGAL | WGS-160L | 4.5 GAL/MGAL |
| BIOCLEAR 200 | 0.05 GAL/MGAL | WPB-585L | 1.5 GAL/MGAL |
| WCS-610 | 167 PPT | WXL-117L | 0.3 GAL/MGAL |
| WGA-5L | 12.5 GAL/MGAL | TLF-10102 | 1 GAL/MGAL |
| WNE-342LN | 1 GAL/MGAL | | |

TABLE XVIIa

Test 15 - 1.6 GAL/MGAL TLF-10102 - 375° F. - 50 # KCl sub Test Conditions
M5500Frac Test Report

| | |
|---|---|
| Test Name: | TEST-4113 |
| Fluid ID: | 50 # KCl sub |
| Rotor Number: | R1 |
| Bob Number: | B2 |
| Bob Radius (cm) | 1.2276 |
| Bob Eff. Length (cm): | 7.62 |
| Pre-Test pH: | 7.28 |
| Post-Test pH: | 10.28 |

TABLE XVIIb

Test 15 - 1.6 GAL/MGAL TLF-10102 - 375° F. - 50 # KCl SUB Composition

| Additives | Concentration | Additives | Concentration |
|---|---|---|---|
| SAT WATER | 1000 GAL/MGAL | WGS-160L | 4.5 GAL/MGAL |
| BIOCLEAR 200 | 0.05 GAL/MGAL | WPB-585L | 1.5 GAL/MGAL |
| WCS-631 | 2 GAL/MGAL | WXL-117L | 0.3 GAL/MGAL |
| WGA-5L | 10 GAL/MGAL | TLF-10102 | 1.6 GAL/MGAL |
| WNE-342LN | 1 GAL/MGAL | | |

TABLE XVIIIa

Test 16 - 1.6 GAL/MGAL TLF-10102 - 350° F. - 40 # KCl sub Test Conditions
M5500Frac Test Report

| | |
|---|---|
| Test Name: | TEST-4112 |
| Fluid ID: | 40 # KCl sub |
| Rotor Number: | R1 |
| Bob Number: | B2 |
| Bob Radius (cm) | 1.2276 |
| Bob Eff. Length (cm): | 7.62 |
| Pre-Test pH: | 7.38 |
| Post-Test pH: | 10.28 |

TABLE XVIIIb

Test 16 - 1.6 GAL/MGAL TLF-10102 - 350° F. - KCl sub Composition

| Additives | Concentration | Additives | Concentration |
|---|---|---|---|
| SAT WATER | 1000 GAL/MGAL | WNE-342L | 1 GAL/MGAL |
| BIOCLEAR 200 | 0.05 GAL/MGAL | WGS-160L | 4.5 GAL/MGAL |
| WPA-556L | 0.5 GAL/MGAL | WPB-585L | 1.5 GAL/MGAL |
| WCS-631 | 2 GAL/MGAL | WXL-117L | 0.3 GAL/MGAL |
| WGA-5L | 10 GAL/MGAL | TLF-10102 | 1.6 GAL/MGAL |

Referring now to FIGS. 3E-I, viscosity and temperatures plots for various TLF-10102 containing frac fluids are shown for Tests 12-16.

TABLE XIXa

Test 17 - 1.4 GAL/MGAL TLF-10103 40 # KCl sub Test Conditions
M5500Frac Test Report

| | |
|---|---|
| Test Name: | TEST-3541 |
| Fluid ID: | 40 # KCl sub |
| Rotor Number: | R1 |
| Bob Number: | B5 |
| Bob Radius (cm): | 1.5987 |
| Bob Eff. Length (cm): | 7.62 |
| Pre-Test pH: | 10.21 |
| Post-Test pH: | 10.21 |

TABLE XIXb

Test 17 - 1.4 GAL/MGAL TLF-10103 40 # KCl sub Composition

| Additives | Concentration | Additives | Concentration |
|---|---|---|---|
| SAT WATER | 1000 GAL/MGAL | WNE-342L | 1 GAL/MGAL |
| BIOCLEAR 500 | 0.05 GAL/MGAL | WPB-585L | 1.5 GAL/MGAL |
| WGA-5L | 10 GAL/MGAL | WXL-117L | 0.3 GAL/MGAL |
| WCS-631L | 2 GAL/MGAL | TLF-10103 | 1.4 GAL/MGAL |
| WPA-556L | 1 GAL/MGAL | | |

TABLE XXa

Test 18 - 1.6 GAL/MGAL TLF-10103 40 # KCl sub Test Conditions
M5500Frac Test Report

| | |
|---|---|
| Test Name: | TEST-3529 |
| Fluid ID: | 40 # KCl sub |
| Rotor Number: | R1 |
| Bob Number: | B5 |
| Bob Radius (cm): | 1.5987 |
| Bob Eff. Length (cm): | 7.62 |
| Pre-Test pH: | 10.24 |
| Post-Test pH: | 10.24 |

TABLE XXb

Test 18 - 1.6 GAL/MGAL TLF-10103 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10103 | 1.6 GAL/MGAL |
| WGS-160L | 4.5 GAL/MGAL | | |

TABLE XXIa

Test 19 - 1.8 GAL/MGAL TLF-10103 40# WGA-5L Test Conditions
M5500Frac Test Report

| | |
|---|---|
| Test Name: | TEST-3554 |
| Fluid ID: | 40 # KCl sub |
| Rotor Number: | R1 |
| Bob Number: | B5 |
| Bob Radius (cm): | 1.5987 |
| Bob Eff. Length (cm): | 7.62 |
| Pre-Test pH: | 10.29 |
| Post-Test pH: | 10.29 |

TABLE XXIb

Test 19 - 1.8 GAL/MGAL TLF-10103 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10103 | 1.8 GAL/MGAL |
| WGS-160L | 4.5 GAL/MGAL | | |

Figure 4A:
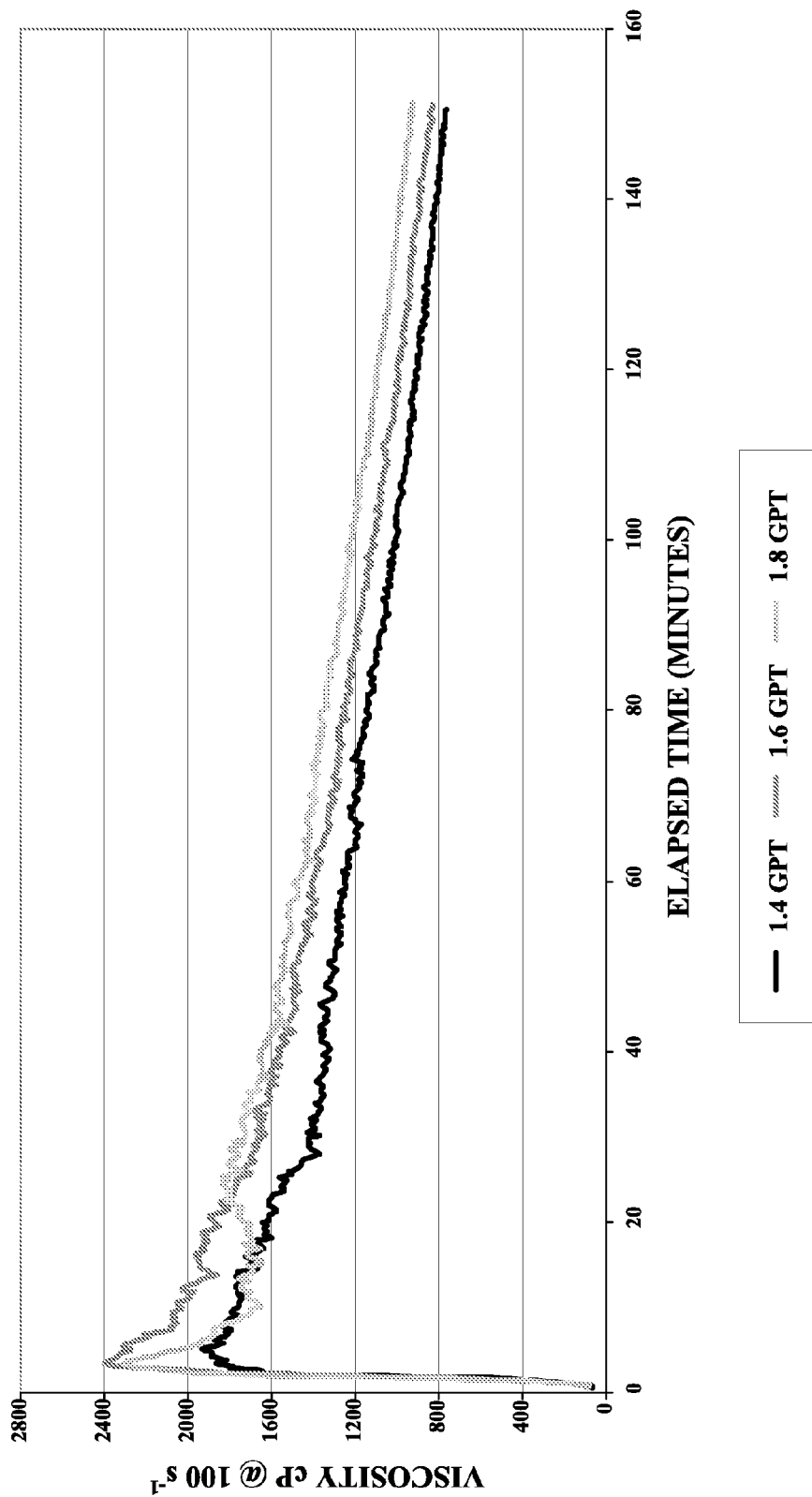
FIG. 4A depict a graph of 300° F. viscosity testing of TLF-10103 at varying loadings.
Figure 4B:
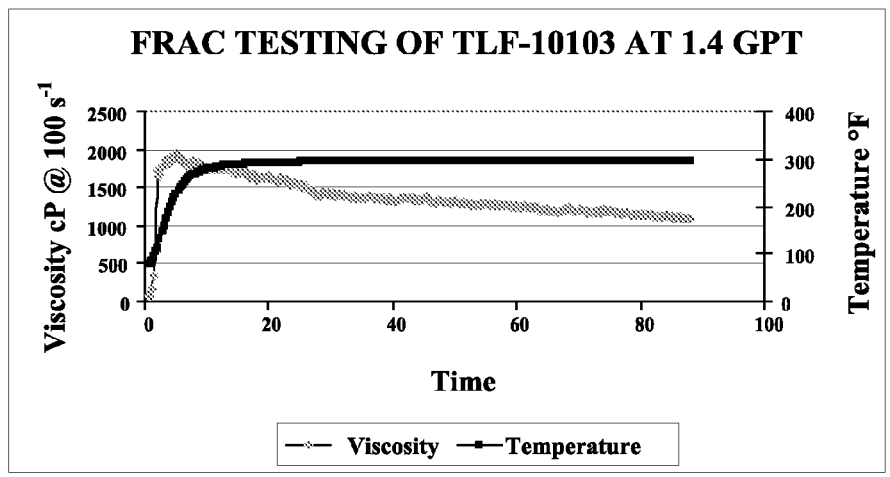
FIG. 4B depict a graph of Frac testing of TLF-10103 at 1.4 Gal/MGal.
Figure 4C:
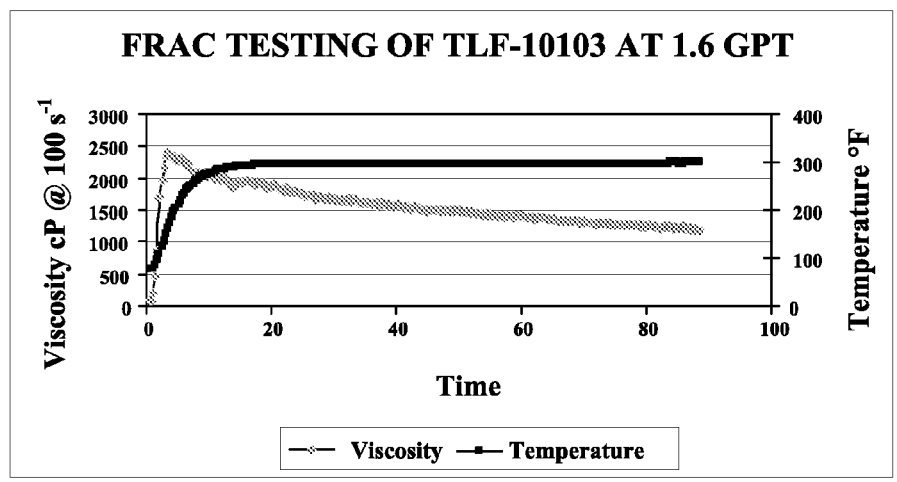
FIG. 4C depict a graph of Frac testing of TLF-10103 at 1.6 Gal/MGal.
Figure 4D:
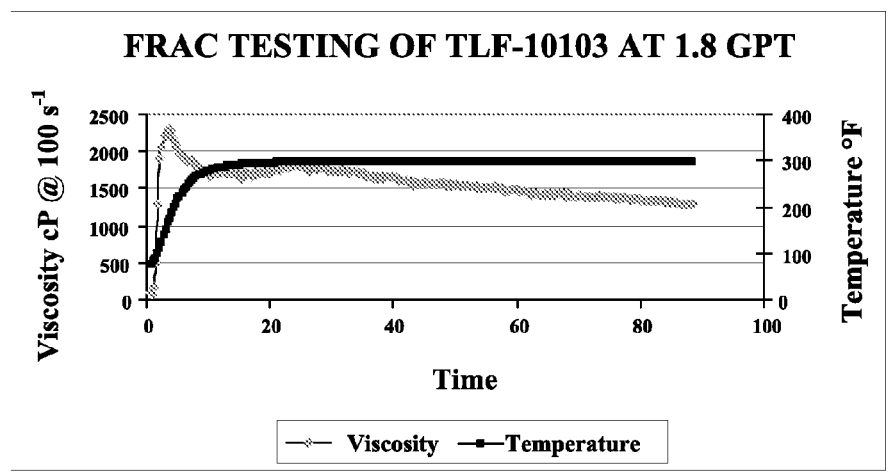
FIG. 4D depict a graph of Frac testing of TLF-10103 at 1.8 Gal/MGal.
Figure 4E:
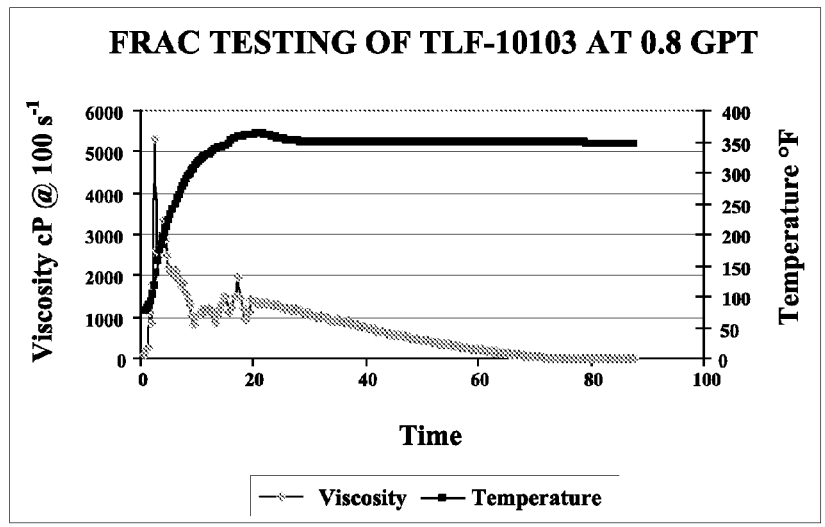
FIG. 4E depict a graph of Frac testing of TLC-10103 at 0.8 Gal/MGal.
Figure 4F:
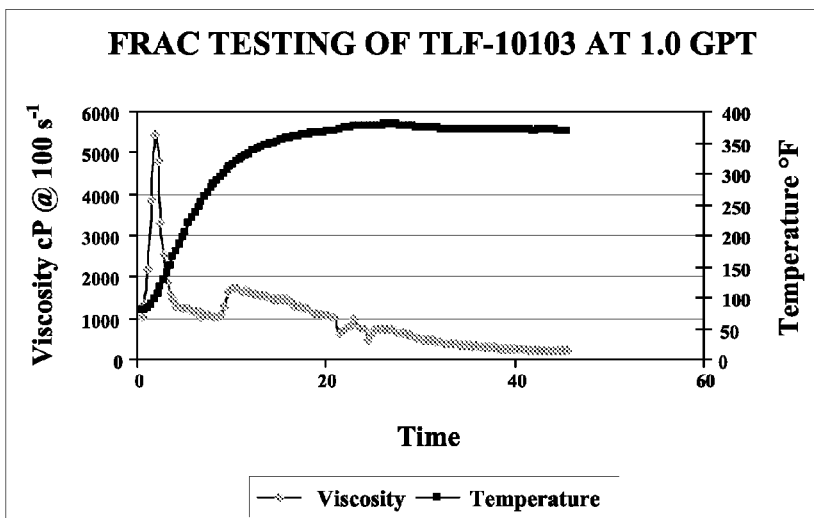
FIG. 4F depict a graph of Frac testing of TLF-10103 at 1.0 Gal/MGal.
Figure 4G:
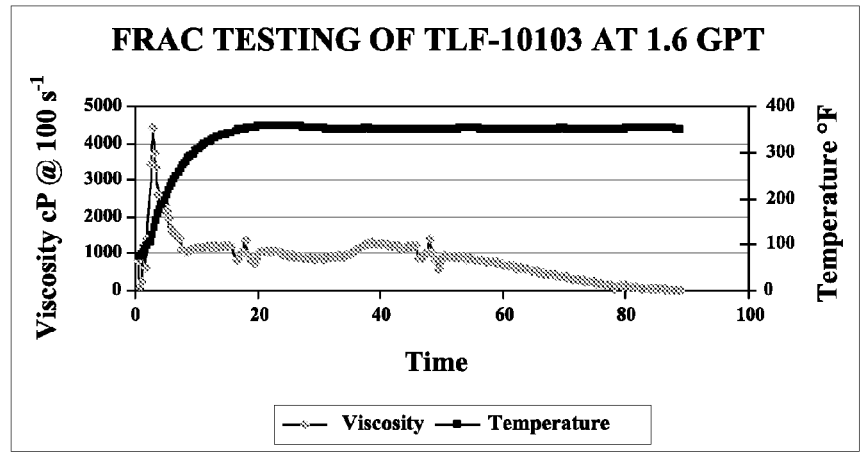
FIG. 4G depict a graph of Frac testing of TLF-10103 at 1.6 Gal/MGal.
Figure 4H:
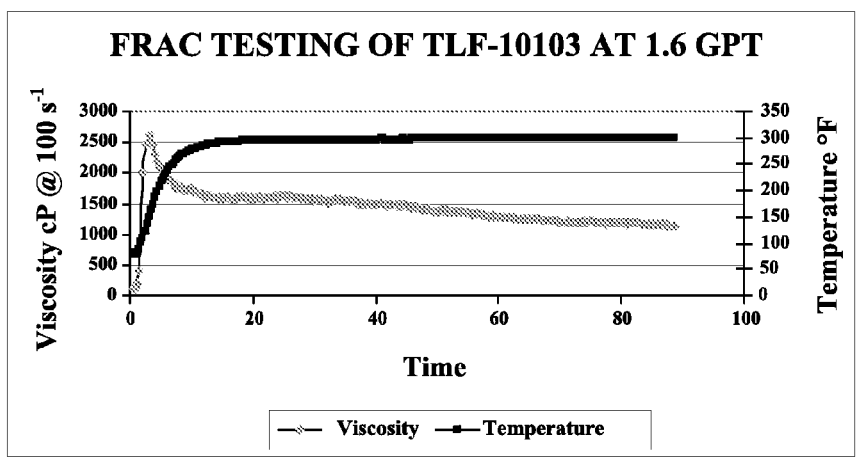
FIG. 4H depict a graph of Frac testing of TLF-10103 at 1.8 Gal/MGal.

Referring now to FIG. 4A, viscosity plots of test results of TLF-10103 cross-linking composition in Tests 17-19 are shown. Referring to FIGS. 4B-D, viscosity and temperatures plots are shown for Tests 17-19.

TABLE XXIIa

Test 20 - 0.8 GAL/MGAL TLF-10103 - 375° F. - 40# 2% KCl
Test Conditions
M5500Frac Test Report

| | |
|---|---|
| Test Name: | TEST-4138 |
| Fluid ID: | 40 # 2% KCl |
| Rotor Number: | R1 |
| Bob Number: | B2 |
| Bob Radius (cm): | 1.2276 |
| Bob Eff. Length (cm): | 7.62 |
| Pre-Test pH: | 7.38 |
| Post-Test pH: | 10.28 |

TABLE XXIIb

Test 20 - 0.8 GAL/MGAL TLF-10103 - 375° F. - 40 # 2% KCl Composition

| Additives | Concentration | Additives | Concentration |
|---|---|---|---|
| SAT WATER | 1000 GAL/MGAL | WNE-342L | 1 GAL/MGAL |
| BIOCLEAR 200 | 0.05 GAL/MGAL | WGS-160L | 4.5 GAL/MGAL |
| WPA-556L | 0.5 GAL/MGAL | WPB-585L | 1.5 GAL/MGAL |
| WCS-610 | 167 GAL/MGAL | WXL-117L | 0.3 GAL/MGAL |
| WGA-5L | 10 GAL/MGAL | TLF-10103 | 0.8 GAL/MGAL |

TABLE XXIIa

Test 21 - 1.0 GAL/MGAL TLF-10103 50 # KCl sub Test Conditions M5500Frac Test Report

| | |
|---|---|
| Test Name: | TEST-4162 |
| Fluid ID: | 50 # KCl sub |
| Rotor Number: | R1 |
| Bob Number: | B2 |
| Bob Radius (cm): | 1.2276 |
| Bob Eff. Length (cm): | 7.62 |
| Pre-Test pH: | 7.44 |
| Post-Test pH: | 10.25 |

TABLE XXIIb

Test 21 - 1.0 GAL/MGAL TLF-10103 50# KCl sub Composition

| Additives | Concentration | Additives | Concentration |
|---|---|---|---|
| SAT WATER | 1000 GAL/MGAL | WNE-342L | 1 GAL/MGAL |
| BIOCLEAR 200 | 0.05 GAL/MGAL | WGS-160L | 4.5 GAL/MGAL |
| WPA-556L | 0.5 GAL/MGAL | WPB-585L | 1.5 GAL/MGAL |
| WCS-610 | 167 PPT | WXL-117L | 0.3 GAL/MGAL |
| WGA-5L | 12.5 GAL/MGAL | TLF-10103 | 1 GAL/MGAL |

TABLE XXIIIa

Test 22 - 1.6 GAL/MGAL TLF-10103 - 350° F. - 40 # KCl sub Test Conditions M5500Frac Test Report

| | |
|---|---|
| Test Name: | TEST-4116 |
| Fluid ID: | 40 # KCl sub |
| Rotor Number: | R1 |
| Bob Number: | B2 |
| Bob Radius (cm): | 1.2276 |
| Bob Eff. Length (cm): | 7.62 |
| Pre-Test pH: | 7.38 |
| Post-Test pH: | 10.28 |

TABLE XXIIIb

Test 22 - 1.6 GAL/MGAL TLF-10103 - 350° F. - 40 # KCl sub Composition

| Additives | Concentration | Additives | Concentration |
|---|---|---|---|
| SAT WATER | 1000 GAL/MGAL | WNE-342L | 1 GAL/MGAL |
| BIOCLEAR 200 | 0.05 GAL/MGAL | WGS-160L | 4.5 GAL/MGAL |
| WPA-556L | 0.5 GAL/MGAL | WPB-585L | 1.5 GAL/MGAL |
| WCS-631 | 2 GAL/MGAL | WXL-117L | 0.3 GAL/MGAL |
| WGA-5L | 10 GAL/MGAL | TLF-10103 | 1.6 GAL/MGAL |

TABLE XXIVa

Test 23 - 1.8 GAL/MGAL TLF-10103 40 # KCl sub Test Conditions M5500Frac Test Report

| | |
|---|---|
| Test Name: | TEST-3549 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.29 |
| Post-Test pH: | 10.29 |

TABLE XXIVb

Test 23 - 1.8 GAL/MGAL TLF-10103 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10103 | 1.8 GAL/MGAL |
| WGS-160L | 4.5 GAL/MGAL | | |

Referring now to FIGS. 4E-H, viscosity and temperatures plots for various TLF-10103 containing frac fluids are shown for Tests 20-23.

TABLE XXVa

Test 24 - 1.4 GAL/MGAL TLF-10104 40 # KCl sub Test Conditions M5500Frac Test Report

| | |
|---|---|
| Test Name: | TEST-3542 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.21 |
| Post-Test pH: | 10.21 |

TABLE XXVb

Test 24 - 1.4 GAL/MGAL TLF-10104 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10104 | 1.4 GAL/MGAL |
| WGS-160L | 4.5 GAL/MGAL | | |

TABLE XXVIa

Test 25 - 1.6 GAL/MGAL TLF-10104 40 # KCl sub Test Conditions M5500Frac Test Report

| | |
|---|---|
| Test Name: | TEST-3530 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.3 |
| Post-Test pH: | 10.31 |

TABLE XXVIb

Test 25 - 1.6 GAL/MGAL TLF-10104 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10104 | 1.6 GAL/MGAL |
| WGS-160L | 4.5 GAL/MGAL | | |

TABLE XXVIIa

Test 26 - 1.8 GAL/MGAL TLF-10104 40 # KCl sub Test Conditions M5500Frac Test Report

| | |
|---|---|
| Test Name: | TEST-3550 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.28 |
| Post-Test pH: | 10.28 |

TABLE XXVIIb

Test 26 - 1.8 GAL/MGAL TLF-10104 40 # KCl sub Composition

| Additives | Concentration | Additives | Concentration |
|---|---|---|---|
| SA WATER | 1000 GAL/MGAL | WNE-342L | 1 GAL/MGAL |
| BIO CLEAR 200 | 0.05 GAL/MGAL | WGS-160L | 4.5 GAL/MGAL |
| WPA-556L | 1 GAL/MGAL | WXL-117L | 0.3 GAL/MGAL |
| WGA-5L | 10 GAL/MGAL | TLF-10104 | 1.8 GAL/MGAL |
| WCS-631L | 2 GAL/MGAL | | |

Figure 5A:
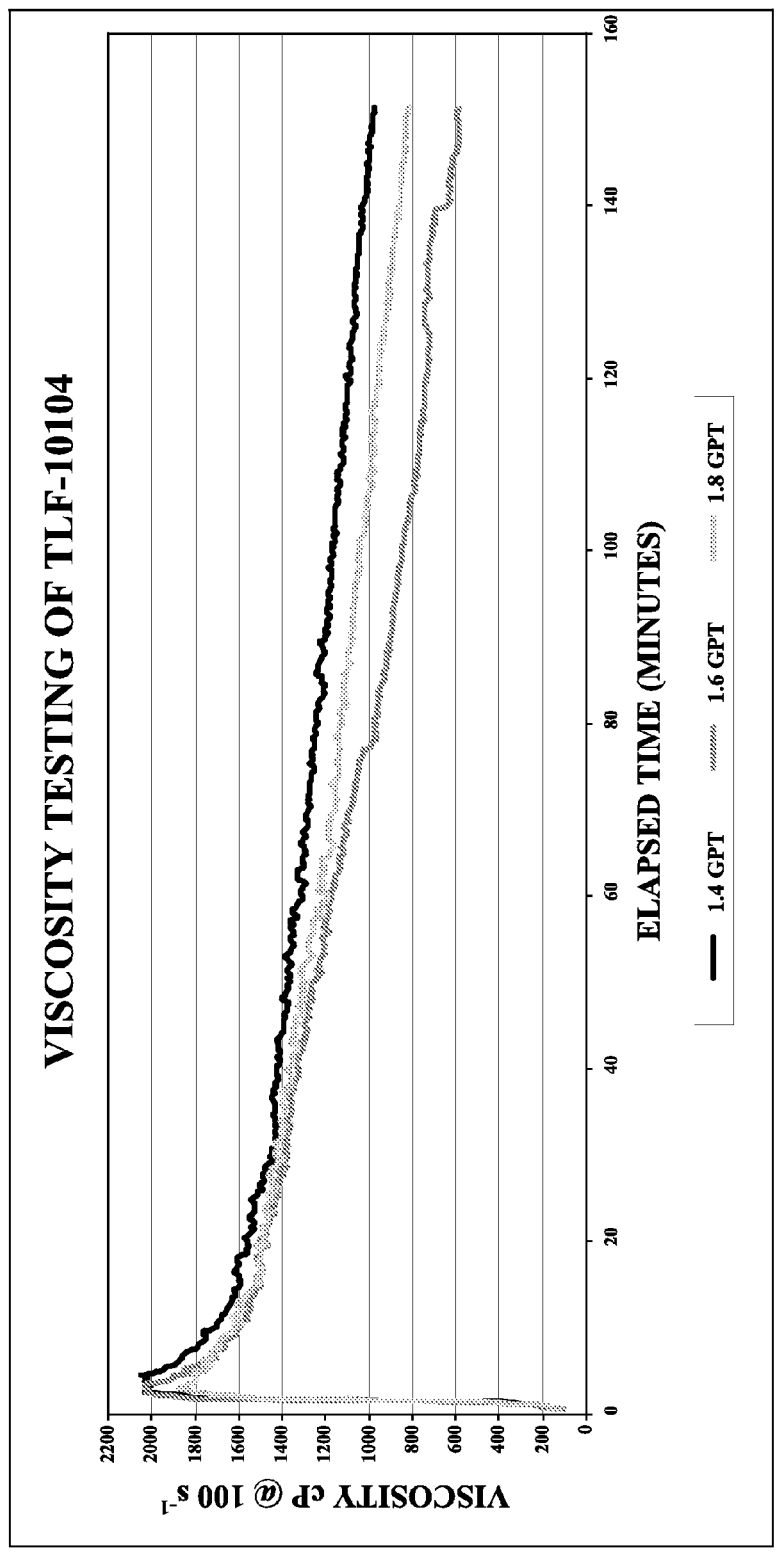
FIG. 5A depict a graph of 300° F. viscosity testing of TLF-10104 at varying loadings.
Figure 5B:
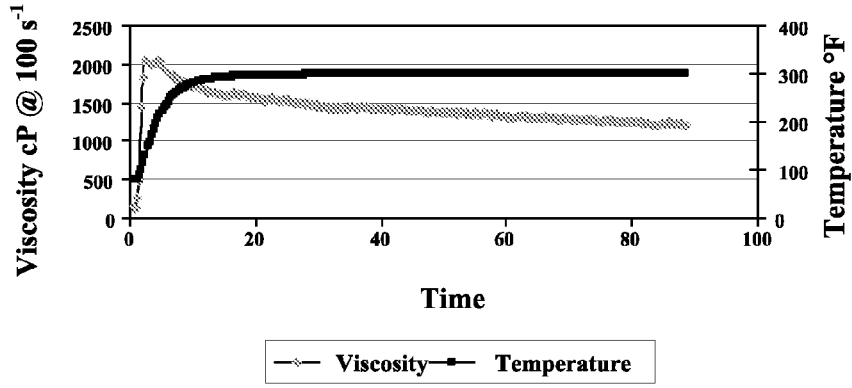
FIG. 5B depict a graph of Frac testing of TLF-10104 at 1.4 Gal/MGal.
Figure 5C:
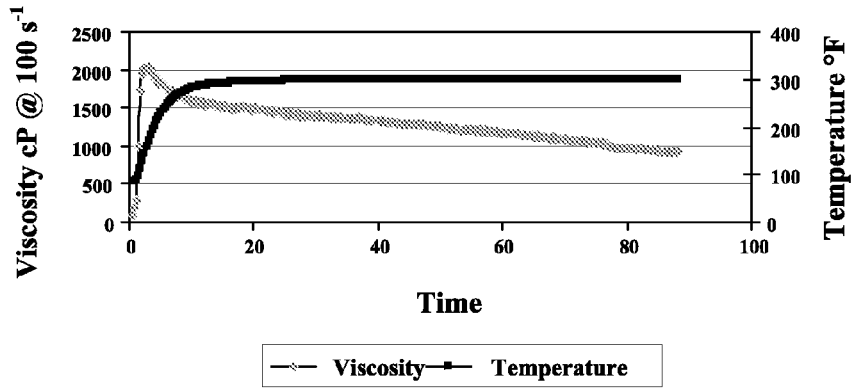
FIG. 5C depict a graph of Frac testing of TLF-10104 at 1.6 Gal/MGal.
Figure 5D:
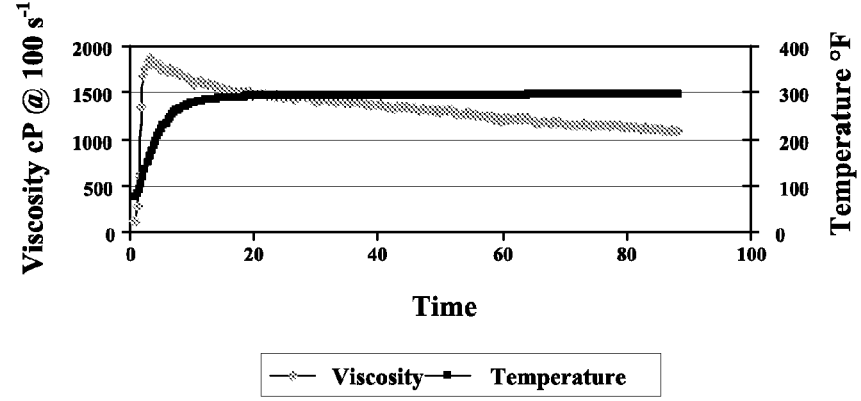
FIG. 5D depict a graph of Frac testing of TLF-10104 at 1.8 Gal/MGal.

Referring now to FIG. 5A, viscosity plots of test results of TLF-10104 cross-linking composition in Tests 24-26 are shown. Referring to FIGS. 5B-D, viscosity and temperatures plots are shown for Tests 24-26.

TABLE XXVIIIa

Test 27 - 1.4 GAL/MGAL TLF-10105 40 # KCl sub Test Conditions M5500Frac Test Report

| | |
|---|---|
| Test Name: | TEST-3543 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.24 |
| Post-Test pH: | 10.24 |

TABLE XXVIIIb

Test 27 - 1.4 GAL/MGAL TLF-10105 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10105 | 1.4 GAL/MGAL |
| WGS-160L | 4.5 GAL/MGAL | | |

TABLE XXIXa

Test 28 - 1.6 GAL/MGAL TLF-10105 40 # KCl sub Test Conditions M5500Frac Test Report

| | |
|---|---|
| Test Name: | TEST-3531 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.3 |
| Post-Test pH: | 10.31 |

TABLE XXIXb

Test 28 - 1.6 GAL/MGAL TLF-10105 40# WGA-5L Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10105 | 1.6 GAL/MGAL |
| WGS-160L | 4.5 GAL/MGAL | | |

TABLE XXXa

Test 29 - 1.8 GAL/MGAL TLF-10105 40 # KCl sub Test Conditions M5500Frac Test Report

| | |
|---|---|
| Test Name: | TEST-3551 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.25 |
| Post-Test pH: | 10.25 |

TABLE XXXb

Test 29 - 1.8 GAL/MGAL TLF-10105 40 # KCl sub Composition

| Additives | Concentration | Additives | Concentration |
|---|---|---|---|
| SAT WATER | 1000 GAL/MGAL | WPB-585L | 1.5 GAL/MGAL |
| BIOCLEAR 200 | 0.05 GAL/MGAL | WPA-556L | 1 GAL/MGAL |
| WGS-631L | 2 GAL/MGAL | WXL-117L | 0.3 GAL/MGAL |
| WNE-342L | 1 GAL/MGAL | TLF-10105 | 1.8 GAL/MGAL |
| WGS-160L | 4.5 GAL/MGAL | | |

Figure 6A:
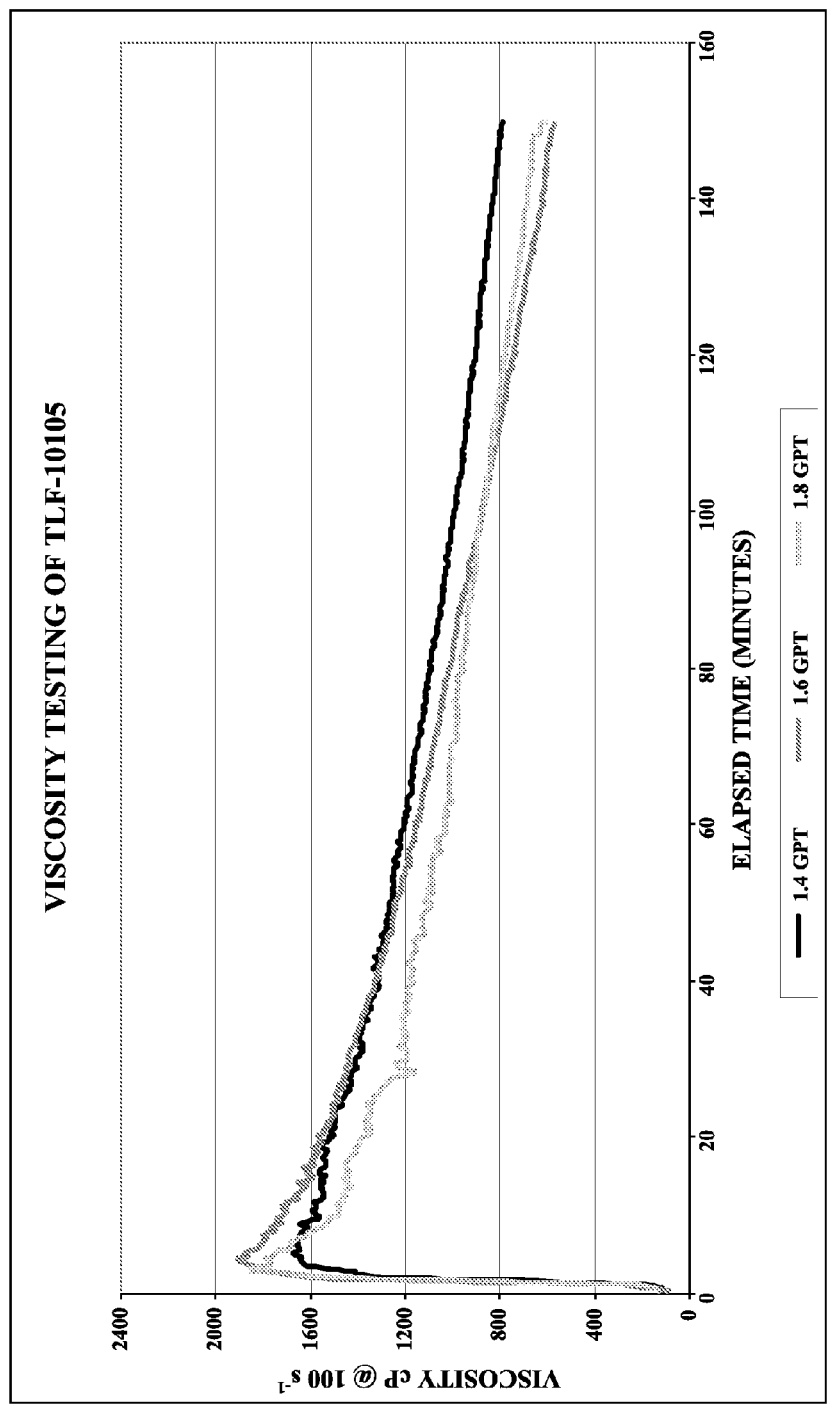
FIG. 6A depict a graph of 300° F. viscosity testing of TLF-10105 at varying loadings.
Figure 6B:
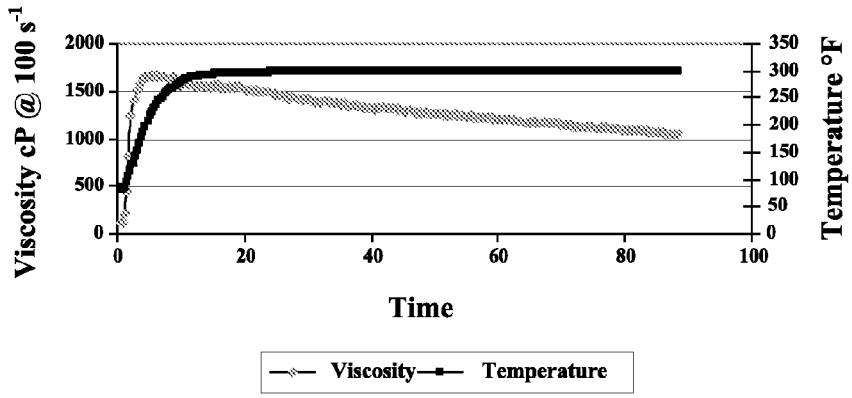
FIG. 6B depict a graph of Frac testing of TLF-10105 at 1.4 Gal/MGal.
Figure 6C:
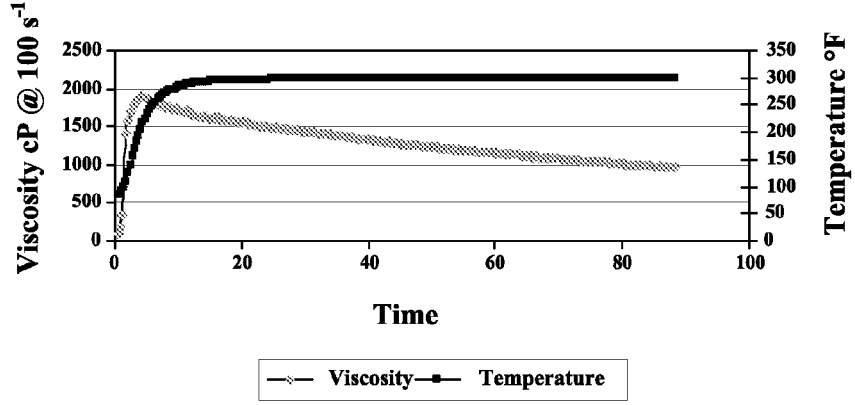
FIG. 6C depict a graph of Frac testing of TLF-10105 at 1.6 Gal/MGal.
Figure 6D:
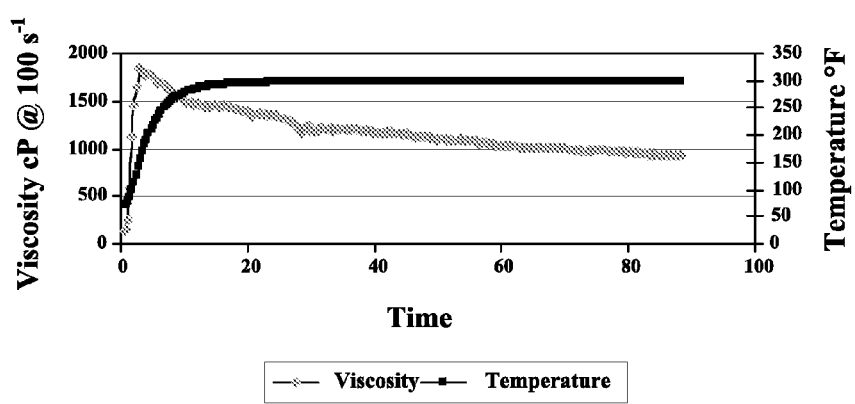
FIG. 6D depict a graph of Frac testing of TLF-10105 at 1.8 Gal/MGal.

Referring now to FIG. 6A, viscosity plots of test results of TLF-10105 cross-linking composition in Tests 27-29 are shown. Referring to FIGS. 6B-D, viscosity and temperatures plots are shown for Tests 27-29.

TABLE XXXIa

Test 30 - 1.4 GAL/MGAL TLF-10106 40 # KCl sub Test Conditions M5500Frac Test Report

| | |
|---|---|
| Test Name: | TEST-3544 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.22 |
| Post-Test pH: | 10.22 |

TABLE XXXIb

Test 30 - 1.4 GAL/MGAL TLF-10106 40 # KCl sub Composition

| Additives | Concentration | Additives | Concentration |
|---|---|---|---|
| SAT WATER | 1000 GAL/MGAL | WNE-342L | 1 GAL/MGAL |
| BIOCLEAR 500 | 0.05 GAL/MGAL | WPB-585L | 1.5 GAL/MGAL |
| WGA-5L | 10 GAL/MGAL | WXL-117L | 0.3 GAL/MGAL |
| WCS-631L | 2 GAL/MGAL | TLF-10106 | 1.4 GAL/MGAL |
| WPA-556L | 1 GAL/MGAL | | |

TABLE XXXIIa

Test 31 - 1.6 GAL/MGAL TLF-10106 40 # KCl sub Test Conditions M5500Frac Test Report

| | |
|---|---|
| Test Name: | TEST-3532 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.2 |
| Post-Test pH: | 10.2 |

TABLE XXXIIb

Test 31 - 1.6 GAL/MGAL TLF-10106 40 # KCl sub Composition

| Additives | Concentration | Additives | Concentration |
|---|---|---|---|
| SA WATER | 1000 GAL/MGAL | WNE-342L | 1 GAL/MGAL |
| BIO CLEAR 200 | 0.05 GAL/MGAL | WGS-160L | 4.5 GAL/MGAL |
| WPA-556L | 1 GAL/MGAL | WXL-117L | 0.3 GAL/MGAL |
| WGA-5L | 10 GAL/MGAL | TLF-10106 | 1.6 GAL/MGAL |
| WCS-631L | 2 GAL/MGAL | | |

TABLE XXXIIIa

Test 32 - 1.8 GAL/MGAL TLF-10106 40 # KCl sub Test Conditions M5500Frac Test Report

| | |
|---|---|
| Test Name: | TEST-3553 |
| Fluid ID: | 40 # KCl sub |
| Rotor Number: | R1 |
| Bob Number: | B5 |
| Bob Radius (cm) | 1.5987 |
| Bob Eff. Length (cm): | 7.62 |
| Pre-Test pH: | 10.25 |
| Post-Test pH: | 10.25 |

TABLE XXXIIIb

Test 32 - 1.8 GAL/MGAL TLF-10106 40 # KCl sub Composition

| Additives | Concentration | Additives | Concentration |
|---|---|---|---|
| SA WATER | 1000 GAL/MGAL | WNE-342L | 1 GAL/MGAL |
| BIO CLEAR 200 | 0.05 GAL/MGAL | WGS-160L | 4.5 GAL/MGAL |
| WPA-556L | 1 GAL/MGAL | WXL-117L | 0.3 GAL/MGAL |
| WGA-5L | 10 GAL/MGAL | TLF-10106 | 1.8 GAL/MGAL |
| WCS-631L | 2 GAL/MGAL | | |

Figure 7A:
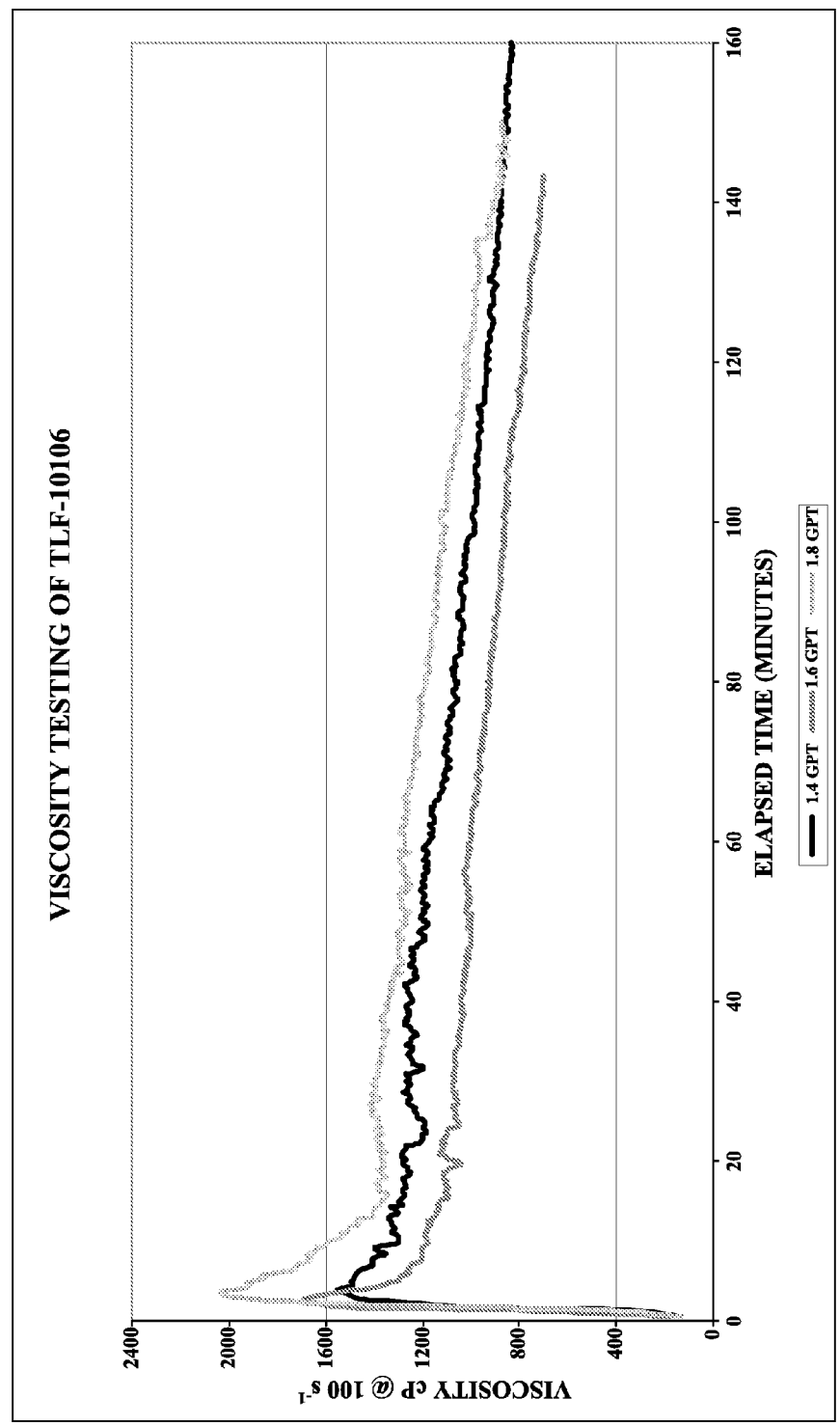
FIG. 7A depict a graph of 300° F. viscosity testing of TLF-10106 at varying loadings.
Figure 7B:
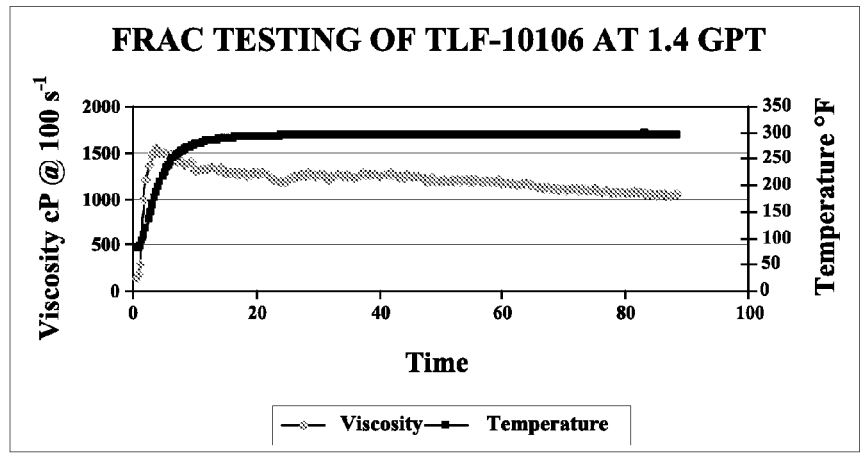
FIG. 7B depict a graph of Frac testing of TLF-10106 at 1.4 Gal/MGal.
Figure 7C:
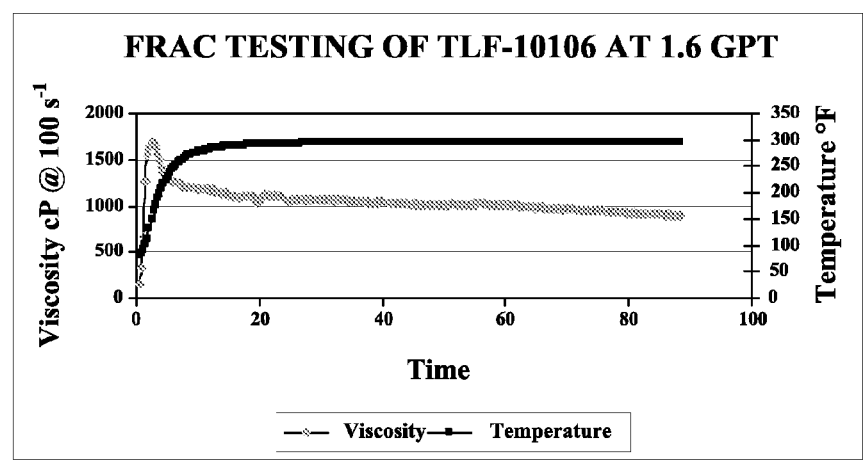
FIG. 7C depict a graph of Frac testing of TLF-10106 at 1.6 Gal/MGal.
Figure 7D:
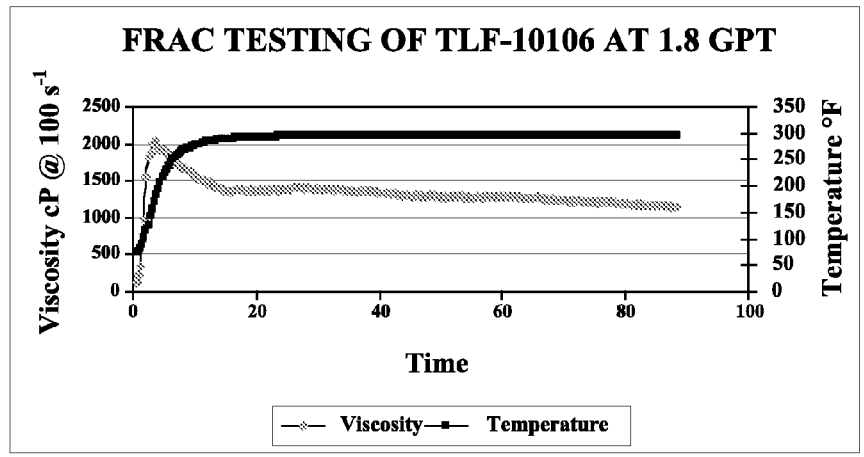
FIG. 7D depict a graph of Frac testing of TLF-10106 at 1.8 Gal/MGal.

Referring now to FIG. 7A, viscosity plots of test results of TLF-10106 cross-linking composition in Tests 30-32 are shown. Referring to FIGS. 7B-D, viscosity and temperatures plots are shown for Tests 30-32.

TABLE XXXIVa

Test 33 - 0.8 GAL/MGAL TLF-10106 - 350° F. - 40 # 2% KCl Test Conditions M5500 Frac Test Report

| | |
|---|---|
| Test Name: | TEST-4145 |
| Fluid ID: | 40 # 2% KCl |
| Rotor Number: | R1 |
| Bob Number: | B2 |
| Bob Radius (cm) | 1.2276 |
| Bob Eff. Length (cm): | 7.62 |
| Pre-Test pH: | 7.44 |
| Post-Test pH: | 10.25 |

TABLE XXXIVb

Test 33 - 0.8 GAL/MGAL TLF-10106 - 350° F.- 40 # 2% KCl Composition

| Component | Concentration | Component | Concentration |
|---|---|---|---|
| SAT WATER | 1000 GAL/MGAL | WNE-342L | 1 GAL/MGAL |
| BIOCLEAR 200 | 0.05 GAL/MGAL | WGS-160L | 4.5 GAL/MGAL |
| WPA-556L | 0.5 GAL/MGAL | WPB-585L | 1.5 GAL/MGAL |
| WCS-610 | 167 PPT | WXL-117L | 0.3 GAL/MGAL |
| WGA-5L | 10 GAL/MGAL | TLF-10106 | 0.8 GAL/MGAL |

TABLE XXXVa

Test 34 - 1.6 GAL/MGAL TLF-10106 - 350° F. - 40# 2% KCl Test Conditions M5500Frac Test Report

| | |
|---|---|
| Test Name: | TEST-4126 |
| Fluid ID: | 40 # 2% KCl |
| Rotor Number: | R1 |
| Bob Number: | B2 |
| Bob Radius (cm) | 1.2276 |
| Bob Eff. Length (cm): | 7.62 |
| Pre-Test pH: | 7.43 |
| Post-Test pH: | 10.26 |

TABLE XXXVb

Test 34 - 1.6 GAL/MGAL TLF-10106 - 350° F.- 30 # 2% KCl Composition

| Additives | Concentration | Additives | Concentration |
|---|---|---|---|
| SAT WATER | 1000 GAL/MGAL | WGS-160L | 4.5 GAL/MGAL |
| BIOCLEAR 200 | 0.05 GAL/MGAL | WPB-585L | 1.5 GAL/MGAL |
| WCS-631 | 2 GAL/MGAL | WXL-117L | 0.3 GAL/MGAL |
| WGA-5L | 10 GAL/MGAL | TLF-10106L | 1.6 GAL/MGAL |
| WNE-342LN | 1 GAL/MGAL | | |

TABLE XXXVIa

Test 35 - 1.6 GAL/MGAL TLF-10106 - 350° F. - 40 # 2% KCl Test Conditions M5500Frac Test Report

| | |
|---|---|
| Test Name: | TEST-4123 |
| Fluid ID: | 40 # 2% KCL |
| Rotor Number: | R1 |
| Bob Number: | B2 |
| Bob Radius (cm) | 1.2276 |
| Bob Eff. Length (cm): | 7.62 |
| Pre-Test pH: | 7.46 |
| Post-Test pH: | 10.26 |
| Description: | 39 CPS |

TABLE XXXVIb

Test 35 - 1.6 GAL/MGAL TLF-10106 - 350° F. - 40 #
2% KCl Composition

| Additives | Concentration | Additives | Concentration |
|---|---|---|---|
| SAT WATER | 1000 GAL/MGAL | WNE-342L | 1 GAL/MGAL |
| BIOCLEAR 200 | 0.05 GAL/MGAL | WGS-160L | 4.5 GAL/MGAL |
| WPA-556L | 0.5 GAL/MGAL | WPB-585L | 1.5 GAL/MGAL |
| WCS-631 | 2 GAL/MGAL | WXL-117L | 0.3 GAL/MGAL |
| WGA-5L | 10 GAL/MGAL | TLF-10106L | 1.6 GAL/MGAL |

Figure 7E:
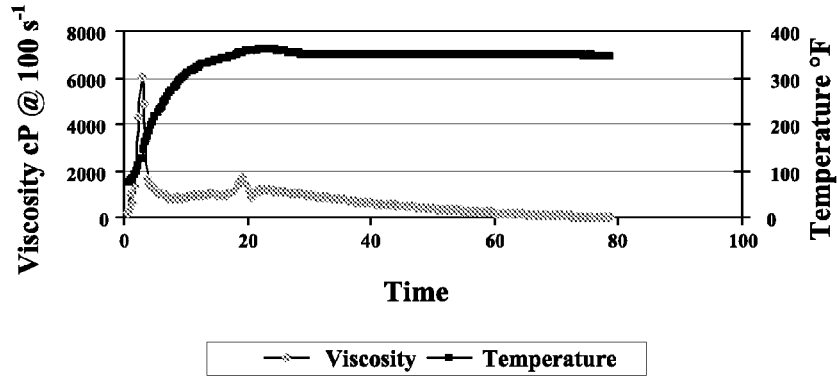
FIG. 7E depict a graph of Frac testing of TLF-10106 at 0.8 Gal/MGal.
Figure 7F:
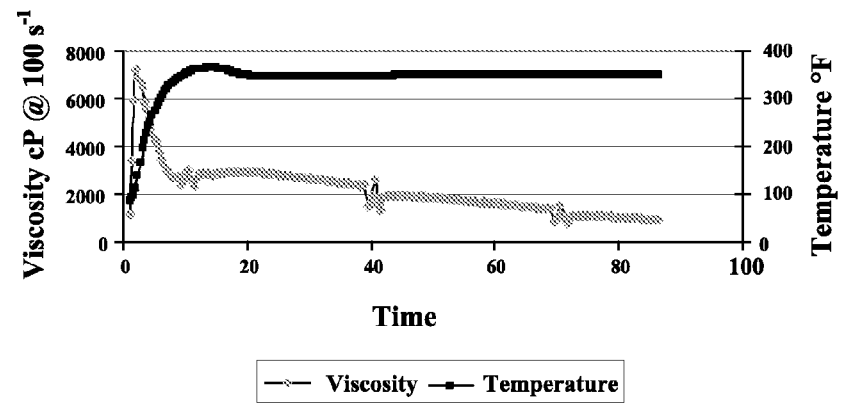
FIG. 7F depict a graph of Frac testing of TLF-10106 at 1.6 Gal/MGal.
Figure 7G:
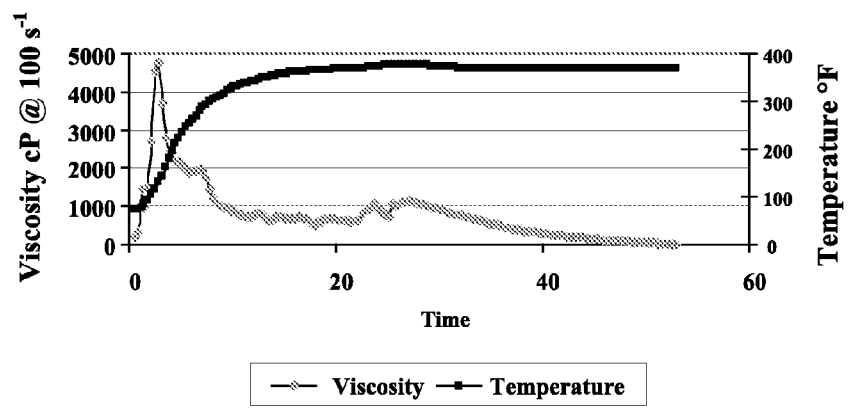
FIG. 7G depict a graph of Frac testing of TLF-10106 at 1.6 Gal/MGal.

Referring now to FIGS. 7E-G, viscosity and temperatures plots for various TLF-10106 containing frac fluids are shown for Tests 33-35.

The above test data shows that the cross-linking compositions of this invention are well suited for all temperatures formation fracturing application and especially for high temperature formation fracturing applications.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A cross-linking composition for hydratable polymer comprising a reaction product of a transition metal alkoxide and a borate compound or a borate generating compound in a molar ratio of boron to transition metal of 1:10 to 10:1 to form boro-transition metallates, where the composition is adapted to cross-link a hydratable polymer or mixture of hydratable polymers to produce a cross-linked polymeric material having improved cross-link uniformity and cross-link stability.

2. The composition of claim 1, wherein the transition metal alkoxide has the general formula MOR, where M is a transition metal selected from the group consisting of Ti, Zr, Hf and mixtures and combinations thereof and R is a carbyl group.

3. The composition of claim 2, wherein R includes from 1 to 40 carbon atoms and sufficient hydrogen atoms to satisfy the valence requirement, where one or more carbon atom can be replaced by B, N, O, Si, S, P, Ge, Ga or the like, and one or more hydrogen atoms are replaced with monovalent atoms or group including F, Cl, Br, I, OH, SH, $NH_2$, NR'H, $NR'_2$, COOR, CHO, $CONH_2$, CONR'H, or $CONR'_2$.

4. The composition of claim 2, wherein R is selected from the group consisting of methoxide, ethoxide, propoxide, isopropoxide, butoxide, isobutoxide, t-butoxide, pentoxide, isopentoxide, neo-pentoxide, six carbon atom alkoxides, seven carbon atom alkoxides, eight carbon atom alkoxides, up to forty carbon atom alkoxides.

5. The composition of claim 1, wherein the ratio is between 5:1 and 1:5.

6. The composition of claim 1, wherein the ratio is between 4:1 and 1:4.

7. The composition of claim 1, wherein the ratio is between 3:1 and 1:3.

8. The composition of claim 1, wherein the ratio is between 2:1 and 1:2.

9. The composition of claim 1, wherein the ratio is 1:1.

10. A fracturing fluid comprising a hydratable polymer system and a reaction product of a transition metal alkoxide and a borate compound or a borate generating compound in a molar ratio of boron to transition metal of 1:10 to 10:1 to form ~t boro-transition metallates cross-linking system, where the cross-linking system is adapted to cross-link the hydratable polymer(s) in the hydratable polymer system to produce a cross-linked polymeric material in the fluid, where the material has improved cross-link uniformity and cross-link stability.

11. The fluid of claim 10, wherein the transition metal alkoxide has the general formula MOR, where M is a transition metal selected from the group consisting of Ti, Zr, Hf and mixtures and combinations thereof and R is a carbyl group.

12. The fluid of claim 11, wherein R includes from 1 to 40 carbon atoms and sufficient hydrogen atoms to satisfy the valence requirement, where one or more carbon atom can be replaced by B, N, O, Si, S, P, Ge, Ga or the like, and one or more hydrogen atoms are replaced with monovalent atoms or group including F, Cl, Br, I, OH, SH, $NH_2$, NR'H, $NR'_2$, COOR, CHO, $CONH_2$, CONR'H, or $CONR'_2$.

13. The composition fluid of claim 11, wherein R is selected from the group consisting of methoxide, ethoxide, propoxide, isopropoxide, butoxide, isobutoxide, t-butoxide, pentoxide, isopentoxide, neo-pentoxide, six carbon atom alkoxides, seven carbon atom alkoxides, eight carbon atom alkoxides, up to forty carbon atom alkoxides.

14. A method for cross-linking a hydratable polymer system comprising the steps of:
adding an effective amount of a cross-linking system including a reaction product of a borate generating compound and a transition metal alkoxide in a molar ratio of boron to transition metal of 1:10 to 10:1 to form boro-transition metallates, where the effective amount is sufficient to cross link the hydratable polymer in the hydratable polymer system to a desired degree, where the cross-linking system results in shorter viscosity build up times compared to other cross-linking systems and has improved cross-link uniformity and cross-link stability.

15. The method of claim 14, wherein the transition metal alkoxide has the general formula MOR, where M is a transition metal selected from the group consisting of Ti, Zr, Hf and mixtures and combinations thereof and R is a carbyl group.

16. The method of claim 15, wherein R includes from 1 to 40 carbon atoms and sufficient hydrogen atoms to satisfy the valence requirement, where one or more carbon atom can be replaced by B, N, O, Si, S, P, Ge, Ga or the like, and one or more hydrogen atoms are replaced with monovalent atoms or group including F, Cl, Br, I, OH, SH, $NH_2$, NR'H, $NR'_2$, COOR, CHO, $CONH_2$, CONR'H, or $CONR'_2$.

17. The method of claim 15, wherein R is selected from the group consisting of methoxide, ethoxide, propoxide, isopropoxide, butoxide, isobutoxide, t-butoxide, pentoxide, isopentoxide, neo-pentoxide, six carbon atom alkoxides, seven carbon atom alkoxides, eight carbon atom alkoxides, up to forty carbon atom alkoxides.

18. A method for fracturing a formation comprising the step of:
injecting a fracturing fluid into a formation under fracturing conditions, where the fluid includes a hydratable polymer system and a cross-linking system, where the cross-linking system comprise a reaction product between a transition metal alkoxide and a borate compound or a borate generating compound in a molar ratio of boron to transition metal of 1:10 to 10:1 to form boro-transition metallates and where the cross-linking system is adapted to cross-link the hydratable polymers in the hydratable polymer system to a desired degree, and where the cross-linking system results in shorter viscosity build up times compared to other cross-linking systems and has improved cross-link uniformity and cross-link stability.

19. The method of claim 18, wherein the transition metal alkoxide has the general formula MOR, where M is a transition metal selected from the group consisting of Ti, Zr, Hf and mixtures and combinations thereof and R is a carbyl group.

20. The method of claim 19, wherein R includes from 1 to 40 carbon atoms and sufficient hydrogen atoms to satisfy the valence requirement, where one or more carbon atom can be replaced by B, N, O, Si, S, P, Ge, Ga or the like, and one or more hydrogen atoms are replaced with monovalent atoms or group including F, Cl, Br, I, OH, SH, $NH_2$, NR'H, $NR'_2$, COOR, CHO, $CONH_2$, CONR'H, or $CONR'_2$.

21. The method of claim 19, wherein R is selected from the group consisting of methoxide, ethoxide, propoxide, isopropoxide, butoxide, isobutoxide, t-butoxide, pentoxide, isopentoxide, neo-pentoxide, six carbon atom alkoxides, seven carbon atom alkoxides, eight carbon atom alkoxides, up to forty carbon atom alkoxides.

22. A method for fracturing a formation comprising the steps of:
injecting a fracturing fluid in a formation under fracturing conditions, where the fluid includes a hydratable polymer system and a cross-linking system, where the cross-linking system comprises a reaction product of a transition metal alkoxide and a borate compound or a borate generating compound in a molar ratio of boron to transition metal of 1:10 to 10:1 to form boro-transition metallates and where the cross-linking system is adapted to cross-link the hydratable polymers in the hydratable polymer system to a desired degree, and where the cross-linking system results in shorter viscosity build up times compared to other cross-linking systems and has improved cross-link uniformity and cross-link stability,
injecting a breaker into the formation to break the cross-links, and
injecting a proppant fluid including a proppant into the formation to hold open a portion of the fractures formed in the fracturing step.

23. The method of claim 22, wherein the transition metal alkoxide has the general formula MOR, where M is a transition metal selected from the group consisting of Ti, Zr, Hf and mixtures and combinations thereof and R is a carbyl group.

24. The method of claim 23, wherein R includes from 1 to 40 carbon atoms and sufficient hydrogen atoms to satisfy the valence requirement, where one or more carbon atom can be replaced by B, N, O, Si, S, P, Ge, Ga or the like, and one or more hydrogen atoms are replaced with monovalent atoms or group including F, Cl, Br, I, OH, SH, $NH_2$, NR'H, $NR'_2$, COOR, CHO, $CONH_2$, CONR'H, or $CONR'_2$.

25. The method of claim 23, wherein R is selected from the group consisting of methoxide, ethoxide, propoxide, isopropoxide, butoxide, isobutoxide, t-butoxide, pentoxide, isopentoxide, neo-pentoxide, six carbon atom alkoxides, seven carbon atom alkoxides, eight carbon atom alkoxides, up to forty carbon atom alkoxides.

* * * * *